United States Patent
Yi et al.

(10) Patent No.: US 12,464,522 B2
(45) Date of Patent: Nov. 4, 2025

(54) METHOD AND APPARATUS FOR TRANSMITTING UPLINK CHANNEL IN WIRELESS COMMUNICATION SYSTEM

(71) Applicant: Samsung Electronics Co., Ltd., Suwon-si (KR)

(72) Inventors: Junyung Yi, Suwon-si (KR); Youngbum Kim, Suwon-si (KR); Sungjin Park, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 17/740,822

(22) Filed: May 10, 2022

(65) Prior Publication Data

US 2022/0377778 A1 Nov. 24, 2022

(30) Foreign Application Priority Data

May 10, 2021 (KR) .......................... 10-2021-0060153

(51) Int. Cl.
*H04W 72/20* (2023.01)

(52) U.S. Cl.
CPC .................................... *H04W 72/20* (2023.01)

(58) Field of Classification Search
CPC ............... H04W 72/20; H04W 72/569; H04W 72/1268; H04W 72/0446; H04L 5/0096
See application file for complete search history.

(56) References Cited

U.S. PATENT DOCUMENTS

2016/0007220 A1\* 1/2016 Suzuki ...................... H04L 1/00 370/280
2019/0190747 A1\* 6/2019 Park ..................... H04W 72/046
(Continued)

FOREIGN PATENT DOCUMENTS

EP 3 500 008 A1 6/2019
KR 10-2020-0054086 A 5/2020
(Continued)

OTHER PUBLICATIONS

3GPP TS 38.213, 3rd Generation Partnership Project; Technical Specification Group Radio Access Network; NR; Physical layer procedures for control (Release 17), Mar. 2022.
(Continued)

*Primary Examiner* — Donald L Mills
(74) *Attorney, Agent, or Firm* — Jefferson IP Law, LLP

(57) ABSTRACT

The disclosure relates to a $5^{th}$ generation (5G) or pre-5G communication system for supporting a higher data transmission rate than a $4^{th}$ generation (4G) communication system such as long term evolution (LTE). An operating method of a terminal in a wireless communication system is provided. The operating method includes receiving, from a base station, first configuration information regarding transport block (TB) processing over multi-slot (TBoMS) or a joint channel configuration, allocating a physical uplink shared channel (PUSCH) transmission resource based on the first configuration information, receiving, from the base station, second configuration information regarding a cancellation indication (CI) or a dynamic slot-format indication (SFI), determining whether to transmit the PUSCH transmission resource, based on the second configuration information, configuring a transmit power and a phase regarding TBoMS PUSCH transmission, PUSCH transmission, or PUSCH repetitive transmission, based on the first configuration information, and performing at least one of the
(Continued)

Rule of overlapping of CI and dynamic SFI through PUSCH repetition
(Bundle size: 4 in the case of slot) (1201):

( [ ] [ ] ) : Joint channel estimation

TBoMS PUSCH transmission, the PUSCH transmission, or the PUSCH repetitive transmission, based on the PUSCH transmission resource.

15 Claims, 18 Drawing Sheets

(56) References Cited

U.S. PATENT DOCUMENTS

| | | | | |
|---|---|---|---|---|
| 2020/0266946 | A1* | 8/2020 | Kim | H04L 27/261 |
| 2021/0105090 | A1* | 4/2021 | Park | H04W 80/02 |
| 2021/0360610 | A1* | 11/2021 | Kim | H04W 72/02 |
| 2022/0225388 | A1* | 7/2022 | You | H04W 72/23 |
| 2022/0329353 | A1 | 10/2022 | Yi et al. | |

FOREIGN PATENT DOCUMENTS

| | | |
|---|---|---|
| KR | 10-2021-0033940 A | 3/2021 |
| KR | 10-2022-0135577 A | 10/2022 |
| WO | 2016/073591 A1 | 5/2016 |
| WO | 2020/167650 A1 | 8/2020 |

OTHER PUBLICATIONS

3GPP TS 38.214, 3rd Generation Partnership Project; Technical Specification Group Radio Access Network; NR; Physical layer procedures for control (Release 17), Mar. 2022.
Ad-hoc Chair (Samsung), Chairman's notes of AI 7.2.6 Physical Layer Enhancements for NR URLLC, 3GPP TSG RAN WG1 Meeting #99 R1-1913577 Reno, USA, Nov. 18-22, 2019.
Panasonic, Discussion on potential techniques for coverage enhancements, R1-2003817, 3GPP TSG RAN WG1 #101-e, e-Meeting, May 15, 2020.
Huawei et al., PUSCH enhancements for URLLC, RI-1901559, 3GPP TSG RAN WGI Meeting #96, Athens, Greece, 25 Feb. 16, 2019.
Extended European Search Report dated Sep. 5, 2023, issued in European Patent Application No. 22800996.5.
Interdigital, Inc., Joint channel estimation for PUSCH, R1-2103009, 3GPP TSG RAN WG1 #104-bis-e e-Meeting, Apr. 12-Apr. 20, 2021.
Interdigital, Inc., TB processing over multi-slot PUSCH, R1-2103008, 3GPP TSG RAN WG1 #104b-e e-Meeting, Apr. 12-20, 2021.
Intel Corporation, Discussion on TB processing over multi-slot PUSCH, R1-2103043, 3GPP TSG RAN WG1 #104b-e e-Meeting, Apr. 12-20, 2021.
International Search Report dated Aug. 22, 2022, issued in International Patent Application No. PCT/KR2022/006698.

* cited by examiner

Collision rule regarding PUSCH transmission and repetition (801):

- (Cancellation indicator, CI) (802):

- Dynamic SFI (804)

- PUSCH/PUCCH of different priority (806)

TB processing over multi-slot (TBoMS):

Same PUSCH repetition type A as TDRA for TBoMS (S=5, L=9, k=4) (906):

Same PUSCH repetition type B as TDRA having long symbol L for TBoMS (907):

Rule of overlapping of CI and dynamic SFI through PUSCH repetition
(Bundle size: 4 in the case of slot) (1301):

( [ ] [ ] ) : Joint channel estimation

METHOD AND APPARATUS FOR TRANSMITTING UPLINK CHANNEL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0060153, filed on May 10, 2021, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for transmitting an uplink channel in a wireless communication system.

2. Description of Related Art

Efforts to develop enhanced $5^{th}$ generation (5G) communication systems or pre-5G communication systems have been ongoing in order to meet the increasing demand for wireless data traffic since $4^{th}$ generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency (millimeter wave (mmWave)) band (for example, 60 gigahertz (GHz) band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the superhigh frequency band.

In addition, technologies for evolved small cells, advanced small cells, cloud ratio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FOAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in the 5G systems are developing.

With the recent development of 5G communication systems, there is an increasing need for a method for repeatedly transmitting an uplink in order to extend a cell coverage in a superhigh frequency (mmWave) band.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting an uplink channel in a wireless communication system.

Additional aspects will be set forth in part in the description which follows and, in part, will be apparent from the description, or may be learned by practice of the presented embodiments.

In accordance with an aspect of the disclosure, an operating method of a terminal in a wireless communication system is provided. The operating method includes receiving, from a base station, first configuration information regarding transport block (TB) processing over multi-slot (TBoMS) or a joint channel configuration, allocating a physical uplink shared channel (PUSCH) transmission resource based on the first configuration information, receiving, from the base station, second configuration information regarding a cancellation indication (CI) or a dynamic slot-format indication (SFI), determining whether to transmit the PUSCH transmission resource, based on the second configuration information, configuring a transmit power and a phase regarding TBoMS PUSCH transmission, PUSCH transmission, or PUSCH repetitive transmission, based on the first configuration information, and performing at least one of the TBoMS PUSCH transmission, the PUSCH transmission, or the PUSCH repetitive transmission, based on the PUSCH transmission resource.

In accordance with another aspect of the disclosure, an operating method of a base station in a wireless communication system is provided. The operating method includes transmitting first configuration information regarding TBoMS or a joint channel configuration to a terminal, allocating a PUSCH transmission resource based on the first configuration information, transmitting second configuration information regarding a CI or a dynamic SFI to the terminal, determining whether to transmit the PUSCH transmission resource, based on the second configuration information, receiving at least one of TBoMS PUSCH transmission, PUSCH transmission, or PUSCH repetitive transmission, based on the PUSCH transmission resource, and performing joint channel estimation and decoding with respect to at least one of the TBoMS PUSCH transmission, the PUSCH transmission, or the PUSCH repetitive transmission, based on the PUSCH transmission resource based on the first configuration information.

In accordance with another aspect of the disclosure, a terminal in a wireless communication system is provided. The terminal includes a transceiver, and at least one processor, wherein the at least one processor is configured to receive, from a base station, first configuration information regarding TBoMS or a joint channel configuration, allocate a PUSCH transmission resource based on the first configuration information, receive, from the base station, second configuration information regarding a CI or a dynamic SFI, determine whether to transmit the PUSCH transmission resource, based on the second configuration information, configure a transmit power and a phase regarding TBoMS PUSCH transmission, PUSCH transmission, or PUSCH repetitive transmission, based on the first configuration information, and perform at least one of the TBoMS PUSCH transmission, the PUSCH transmission, or the PUSCH repetitive transmission, based on the PUSCH transmission resource.

In accordance with another aspect of the disclosure, a base station in a wireless communication system is provided. The base station includes a transceiver, and at least one processor, wherein the at least one processor is configured to transmit first configuration information regarding TBoMS or a joint channel configuration to a terminal, allocate a PUSCH transmission resource based on the first configuration information, transmit second configuration information regarding a CI or a dynamic SFI to the terminal, determine whether to transmit the PUSCH transmission resource, based on the second configuration information, receive at least one of TBoMS PUSCH transmission, PUSCH transmission, or PUSCH repetitive transmission, based on the PUSCH transmission resource, and perform joint channel estimation and decoding with respect to at least one of the TBoMS PUSCH transmission, the PUSCH transmission, or the PUSCH repetitive transmission, based on the PUSCH transmission resource based on the first configuration information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
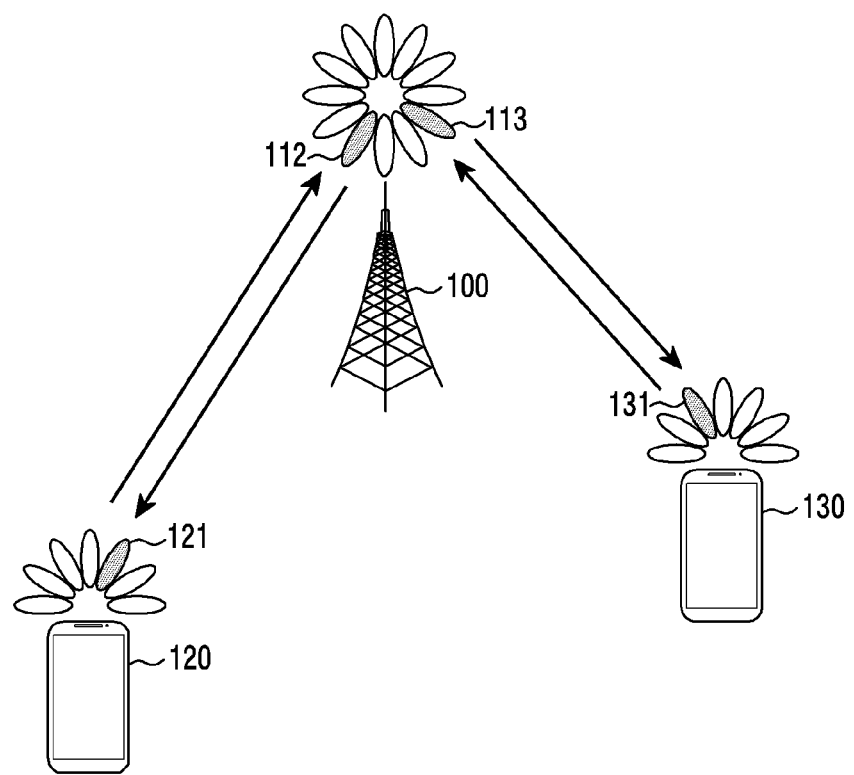
FIG. 1 is a view illustrating a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, hardware-wise approach methods will be described by way of an example. However, various embodiments of the disclosure include technology using both hardware and software, and thus do not exclude software-based approach methods.

Hereinafter, embodiments of the disclosure will be described in detail with reference to the accompanying drawings. The disclosure described hereinbelow will describe embodiments for enhancing a coverage for physical uplink shared channel (PUSCH) transmission, but is not limited to respective embodiments and is applicable to a method of configuring a frequency resource corresponding to other channels by using an entirety of one or more embodiments suggested in the disclosure or a combination of some embodiments. Accordingly, embodiments of the disclosure may be applied through some changes within a range without departing from the scope of the disclosure, based on a determination of a person skilled in the art.

In the following description, detailed descriptions of well-known functions or configurations will be omitted since they would unnecessarily obscure the subject matters of the disclosure. Also, the terms used herein are defined according to the functions of the disclosure. Thus, the terms may vary depending on users' or operators' intentions or practices. Therefore, the terms used herein should be understood based on the descriptions made herein.

Beyond the initial function of providing a voice-oriented service, a wireless communication system is developing into a broadband wireless communication system which provides a packet data service of high-speed, high quality like communication standards, such as high speed packet access (HSPA) of $3^{rd}$ generation partnership project (3GPP), long term evolution (LTE) or evolved universal terrestrial radio access (E-UTRA), LTE-Advanced (LTE-A), LTE-Pro, high rate packet data of 3GPP2, ultra mobile broadband (UWB), and 802.17e of Institute of Electrical and Electronics Engineers (IEEE).

In an LTE system, which is a representative example of the broadband wireless communication system, an orthogonal frequency division multiplexing (OFDM) scheme may be employed in a downlink (DL), and a single carrier-frequency division multiple access (SC-FDMA) scheme may be employed in an uplink (UL). The uplink refers to a wireless link through which a terminal (user equipment (UE) or a mobile station (MS)) transmits data or a control signal to a base station (eNode B (eNB) or a base station (BS)), and the downlink refers to a wireless link through which a base station transmits data or a control signal to a terminal. In addition, the above-described multiple access schemes assign or manage time-frequency resources for carrying and transmitting data or control information for each user not to overlap one another, that is, to establish orthogonality, and thereby distinguish data or control information of each user.

A 5G communication system which is a post-LTE communication system should support a service satisfying various requirements simultaneously so as to freely reflect various requirements of a user and a service provider. Services which are considered for the 5G communication system may include enhanced mobile broadband (eMBB), massive machine type communication (mMTC), ultra-reliability low latency communication (URLLC), etc.

The eMBB aims at providing a high data transmission speed which is more enhanced in comparison to a data transmission speed supported by existing LTE, LTE-A, or LTE-Pro. For example, in the 5G communication system, the eMBB should be able to provide a peak data rate of 20 Gbps in a downlink and to provide a peak data rate of 10 Gbps in an uplink from the point of view of one base station. In addition, the 5G communication system should provide an increased user perceived data rate of a terminal, while providing the peak data rate. In order to meet the requirements described above, there may be a demand for enhancement of various transmission and reception techniques including enhanced multi input multi output (MIMO) transmission techniques. In an LTE system, signals are transmitted by using a maximum transmission bandwidth of 20 MHz in a 20 GHz band, whereas in the 5G communication system, a frequency bandwidth larger than 20 MHz is used in a frequency band of 3-6 GHz or 6 GHz, so that the data transmission speed required in the 5G communication system may be satisfied.

At the same time, the mMTC may be considered in the 5G communication system in order to support an application service such as Internet of thing (IoT). The mMTC requires support of access by massive terminals within a cell, enhanced coverage of a terminal, an increased battery time, reduction of a cost of a terminal in order to provide IoT efficiently. Since the IoT is attached to various sensors and various devices to provide a communication function, the IoT should be able to support many terminals (for example, 1,000,000 terminals/km2) within a cell. Since terminals supporting the mMTC are likely to be positioned in a shaded area that is not covered by a cell, such as a basement of a building, due to characteristics of a service, a broader coverage may be required in comparison to other services provided by the 5G communication system. Since terminals supporting the mMTC should be configured with low-priced terminals, and there may be difficulty in replacing a battery of a terminal frequently, there may be a need for a long battery life time, for example, a battery life of 10-16 years.

Lastly, the URLLC is a cellular-based wireless communication service which is used for a specific purpose (mission-critical). For example, services used for remote control of a robot or a machinery, industrial automation, an unmanned aerial vehicle, remote health care, an emergency alert, etc. may be considered. Accordingly, communication provided by the URLLC should provide very low latency and very high reliability. For example, services supporting the URLLC should satisfy air interface latency shorter than 0.5 millisecond, and simultaneously, should satisfy requirements of a packet error rate lower than or equal to 10-5. Accordingly, the 5G system should provide a shorter transmit time interval (TTI) than those of other services in order to provide a service supporting the URLLC, and simultaneously, should allocate broad resources in a frequency band in order to guarantee reliability of a communication link.

The three services of the 5G communication system (hereinafter, it may be interchangeably used with a 5G system), that is, eMBB, URLLC, mMTC, may be multiplexed in one system and may be transmitted. In this case, different transmission and reception techniques and transmission and reception parameters may be used between services in order to meet different requirements of the respective service.

As used herein, terms indicating signals, terms indicating channels, terms indicating control information, terms indicating network entities, terms indicating components of a device are merely examples for convenience of explanation.

Accordingly, the disclosure is not limited to terms described below, and other terms having the same technical meanings may be used.

In addition, the disclosure describes various embodiments by using terms used in some communication standards (for example, $3^{rd}$ generation partnership project (3GPP)), but these embodiments are merely examples. Various embodiments of the disclosure may be easily modified and applied to other communication systems.

FIG. 1 illustrates a wireless communication system according to an embodiment of the disclosure.

Referring to FIG. 1, it illustrates a base station 100, a terminal 120, and a terminal 130 as part of nodes using a wireless channel in a wireless communication system. FIG. 1 illustrates only one base station, but other base stations which are the same as or similar to the base station 100 may further be included.

The base station 100 is a network infrastructure that provides wireless access to the terminals 120, 130. The base station 100 has a coverage that is defined as a predetermined geographical area based on a distance by which a signal may be transmitted. The base station 100 may be referred to as "access point (AP)", "eNodeB (eNB)", "$5^{th}$ generation (5G) node", "next generation nodeB (gNB)", "wireless point", "transmission/reception point (TRP)", or other terms having the same technical meaning as the above-mentioned terms, in addition to the base station.

Each of the terminal 120 and the terminal 130 is a device which is used by a user, and may communicate with the base station 100 through a wireless channel. In some cases, at least one of the terminal 120 and the terminal 130 may be operated without a user's intervention. That is, at least one of the terminal 120 and the terminal 130 is a device which performs machine type communication (MTC), and may not be carried by a user. Each of the terminal 120 and the terminal 130 may be referred to as "user equipment (UE)", "mobile station", "subscriber station", "remote terminal", "wireless terminal", or "user device", or other terms having the same technical meaning as the above-mentioned terms, in addition to the terminal.

The base station 100, the terminal 120, the terminal 130 may transmit and receive wireless signals in millimeter wave (mmWave) bands (for example, 28 GHz, 30 GHz, 38 GHz, 60 GHz). In this case, the base station 100, the terminal 120, the terminal 130 may perform beamforming to enhance a channel gain. Herein, beamforming may include transmission beamforming and reception beamforming. That is, the base station 100, the terminal 120, the terminal 130 may give directivity to a transmission signal or a reception signal. To achieve this, the base station 100 and the terminals 120, 130 may select serving beams 112, 113, 121, 131 through a beam search or beam management procedure. After the serving beams 112, 113, 121, 131 are selected, communication may be performed through resources that have a quasi co-located (QCL) relationship with resources which transmit the serving beams 112, 113, 121, 131.

As long as large-scale characteristics of a channel which transmits a symbol on a first antenna port are inferred from a channel which transmits a symbol on a second antenna port, the first antenna port and the second antenna port may be evaluated as having a QCL relationship. For example, the large-scale characteristics may include at least one of delay spread, doppler spread, doppler shift, average gain, average delay, spatial receiver parameter.

Figure 2A:
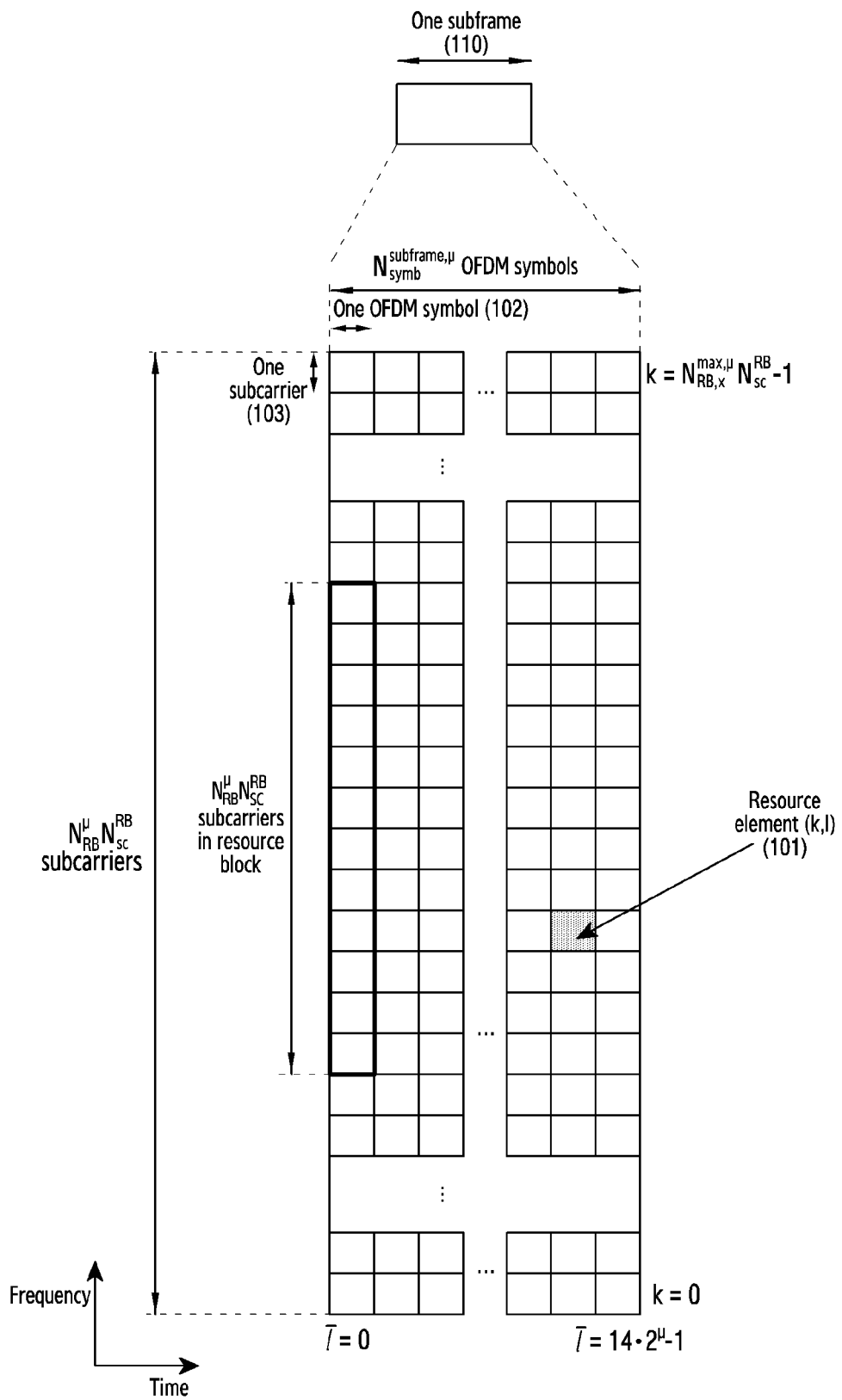
FIG. 2A is a view illustrating a basic structure of a time-frequency domain which is a radio resource domain through which data or a control channel is transmitted in a wireless communication system according to an embodiment of the disclosure.

FIG. 2A illustrates a basic structure of a time-frequency domain which is a radio resource domain through which data or a control channel is transmitted in a wireless communication system according to an embodiment of the disclosure.

Specifically, FIG. 2A is a view illustrating a basic structure of a time-frequency domain which is a radio resource domain of a 5G system.

Referring to FIG. 2A, the horizontal axis indicates a time domain and the vertical axis indicates a frequency domain. A basic unit of a resource in the time and frequency domains may be a resource element (RE) 101, and may be defined by one orthogonal frequency division multiplexing (OFDM) symbol (or discrete Fourier transform spread OFDM (DFT-s-OFDM) symbol) 102 on the time axis, and one subcarrier 103 on the frequency axis. In the frequency domain, $N_{sc}^{RB}$ (for example, 12) continuous REs may constitute one resource block (RB). In addition, in the time domain, $N_{symb}^{subframe}$ continuous OFDM symbols may constitute one subframe 110.

Figure 2B:
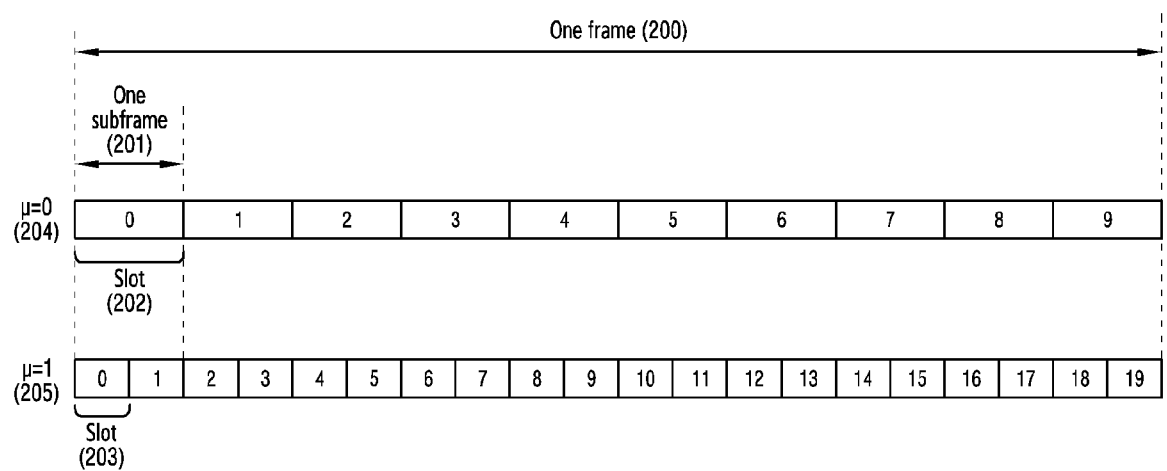
FIG. 2B is a view illustrating a slot structure in a wireless communication system according to an embodiment of the disclosure.

FIG. 2B illustrates a slot structure in a wireless communication system according to an embodiment of the disclosure.

Specifically, FIG. 2B is a view illustrating a slot structure which is considered in a 5G system.

Referring to FIG. 2B, it illustrates an example of a structure of a frame 200, a subframe 201, and a slot 202. One frame 200 may be defined as being 10 ms long. One subframe 201 may be defined as being 1 ms long, and accordingly, one frame 200 may be formed of 10 subframes 201 in total. In addition, one slot 202, 203 may be defined as having 14 OFDM symbols (That is, the number of symbols per slot ($N_{symb}^{slot}$)=14). One subframe 201 may be formed of one or a plurality of slots 202, 203, and the number of slots 202, 203 per subframe 201 may vary according to μ 204, 205 which is a configuration value regarding subcarrier spacing.

In the embodiment of FIG. 2B, a slot structure when a subcarrier spacing configuration value μ is 0 (204) and μ is 1 (205) is illustrated. When μ=0 (204), one subframe 201 may be formed of one slot 202, and, when μ=1 (205), one subframe 201 may be formed of two slots 203. That is, the number of slots per subframe ($N_{slot}^{subframe,\mu}$) may vary according to a configuration value regarding subcarrier spacing, μ, and accordingly, the number of slots per frame ($N_{slot}^{frame,\mu}$) may vary. $N_{slot}^{subframe,\mu}$ and $N_{slot}^{frame,\mu}$ according to each subcarrier spacing configuration μ may be defined as shown in Table 1 presented below:

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 170 | 17 |
| 5 | 14 | 320 | 32 |

Next, a demodulation reference signal (DMRS) which is one of reference signals in a 5G system will be described in detail.

The DMRS may include a plurality of DMRS ports, and the respective ports maintain orthogonality so as not to interfere with one another by using code division multiplexing (CDM) or frequency division multiplexing (FDM). However, the term "DMRS" may be expressed by other terms according to user's intention and a using purpose of a reference signal. More specifically, the term "DMRS"

merely suggests a specific example in order to easily explain technical features of the disclosure and to assist in understanding of the disclosure, and is not intended to limit the scope of the disclosure. That is, it is obvious to a person skilled in the art that the term is applicable to a reference signal which is based on the technical concept of the disclosure.

Figure 3:
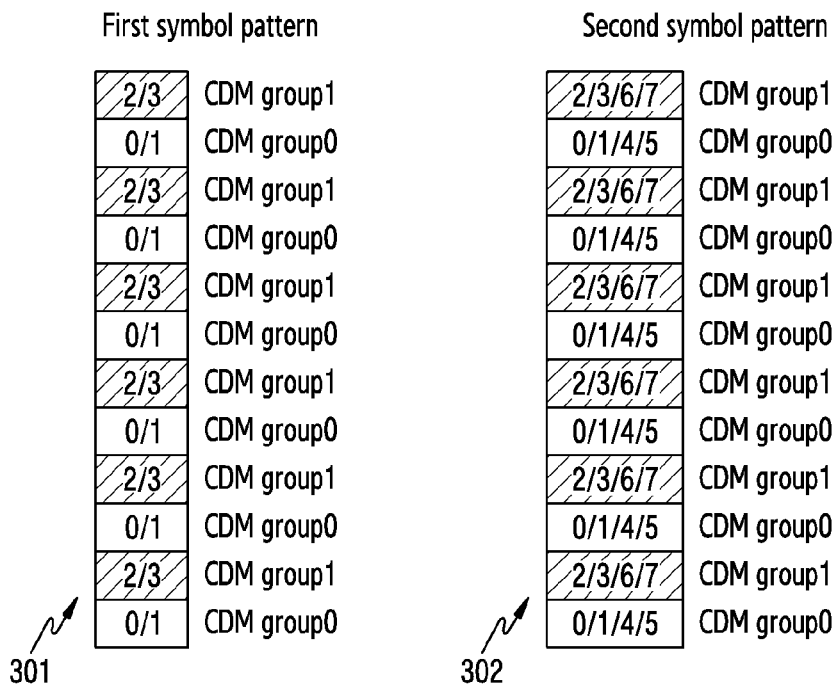
FIG. 3 is a view illustrating a demodulation reference signal (DMRS) pattern which is used for communication between a base station and a terminal in a wireless communication system according to an embodiment of the disclosure.
Figure 3:
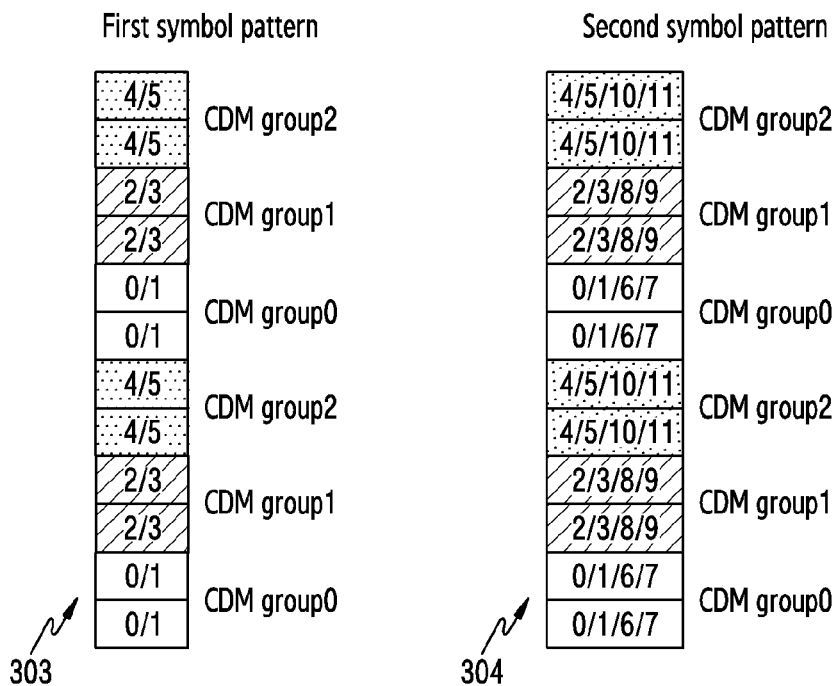

FIG. 3 illustrates a DMRS pattern which is used for communication between a base station and a terminal in a wireless communication system according to an embodiment of the disclosure.

Specifically, FIG. 3 illustrates a DMRS pattern (type 1 and type 2) used for communication between a base station and a terminal in a 5G system.

In the 5G system, two DMRS patterns may be supported. FIG. 3 illustrates two DMRS patterns in detail.

Referring to FIG. 3, a first symbol pattern 301 and a second symbol pattern 302 indicate DMRS type 1. The first symbol pattern 301 and the second symbol pattern 302 of DMRS type 1 of FIG. 3 are DMRS patterns of a structure of combination 2, and may be configured with two CDM groups, and different CDM groups may undergo frequency dimension multiplexing (FDM).

In the first symbol pattern 301 of FIG. 3, CDM on a frequency may be applied to the same CDM group, thereby distinguishing between two DMRS ports, and accordingly, 4 orthogonal DMRS ports in total may be configured. In the first symbol pattern 301 of FIG. 3, DMRS port IDs mapped onto the respective CDM groups are illustrated (in the case of a downlink, +1000 is given to the illustrated numbers and is displayed to indicate the DMRS port ID). In the second symbol pattern 302 of FIG. 3, CDM on time/frequency may be applied to the same CDM group, thereby distinguishing four DMRS ports, and accordingly, 8 orthogonal DMRS ports in total may be configured. In the second symbol pattern 302 of FIG. 3, DMRS port IDs mapped onto the respective CDM groups are illustrated (in the case of a downlink. +1000 is given to the illustrated numbers and is displayed to indicate the DMRS port ID).

DMRS type 2 of a first symbol pattern 303, a second symbol pattern 304 of FIG. 3 is a DMRS pattern of a structure where frequency domain orthogonal cover codes (FD-OCC) are applied to adjacent subcarriers on a frequency, and may be configured with three CDM groups, and different CDM groups may undergo FDM.

In the first symbol pattern 303 of FIG. 3, CDM on a frequency may be applied to the same CDM group, thereby distinguishing between two DMRS ports, and accordingly, 6 orthogonal DMRS ports in total may be configured. In the first symbol pattern 303 of FIG. 3, DMRS port IDs mapped onto the respective CDM groups are illustrated (in the case of a downlink, +1000 is given to the illustrated numbers and is displayed to indicate the DMRS port ID). In the second symbol pattern 304 of FIG. 3, CDM on time/frequency may be applied to the same CDM group, thereby distinguishing four DMRS ports, and accordingly, 12 orthogonal DMRS ports in total may be configured. In the second symbol pattern 304 of FIG. 3, DMRS port IDs mapped onto the respective CDM groups are illustrated (in the case of a downlink. +1000 is given to the illustrated numbers and is displayed to indicate the DMRS port ID).

As described above, in an NR system, two different DMRS patterns, for example, DMRS type 1 of the first symbol pattern 301 and the second symbol pattern 302 of FIG. 3, or DMRS type 2 of the first symbol pattern 303 and the second symbol pattern 304 may be configured. In addition, it may be configured whether a DMRS pattern is the first symbol pattern 301, 303 or the adjacent second symbol pattern 302, 304. In addition, in the NR system, DMRS port numbers may be scheduled, and also, the number of CDM groups scheduled all together may be configured and signaled for the sake of PDSCH rate matching. In addition, in the case of cyclic prefix based orthogonal frequency division multiplex (CP-OFDM), the two DMRS patterns described above may be supported in the DL and the UL, and, in the case of DFT-S-OFDM, only DMRS type 1 among the above-described DMRS patterns may be supported in the UL. In addition, an additional DMRS may be supported to be configured. A front-loaded DMRS may indicate a first DMRS that is positioned in a head symbol in time, and an additional DMRS may indicate a DMRS that is positioned in a symbol after the front-loaded DMRS. In the NR system, the number of additional DMRSs may be configured to at least 0 and at most 3. In addition, when the DMRS is configured, the same pattern as the front-loaded DMRS may be assumed. More specifically, when information regarding whether the DMRS pattern type of the front-loaded DMRS is type 1 or type 2, information regarding whether the DMRS pattern is the first symbol pattern or the adjacent second symbol pattern, and information of the number of CDM groups used along with the DMRS port are indicated, and when an additional DMRS is additionally configured, it may be assumed that, for the additional DMRS, the same DMRS information as the front-loaded DMRS is configured.

More specifically, the above-described downlink DMRS configuration may be configured through RRC signaling as shown in Table 2 presented below:

TABLE 2

```
DMRS-DownlinkConfig : :=    SEQUENCE {
    dmrs-Type (DMRS type configuration)                         ENUMERATED {type2}
OPTIONAL,    -- Need S
    dmrs-AdditionalPosition    (additional DMRS OFDM symbol configuration)
ENUMERATED {pos0, pos1, pos3}    OPTIONAL,    -- Need S
    maxLength (1 symbol or 2symbol DMRS pattern related configuration)    ENUMERATED
{len2} OPTIONAL,    -- Need S
    scramblingID0 (scramblingID0)                               INTEGER (0..65535)
    OPTIONAL,    -- Need S
    scramblingID1 (scrambling ID1)                              INTEGER (0..55535)
OPTIONAL,    -- Need S
    phaseTrackingRS (PTRS configuration)                        SetupRelease { PTRS-
DownlinkConfig } OPTIONAL,    -- Need M
    . . .
}
```

In addition, the above-described uplink DMRS configuration may be configured through RRC signaling as shown in Table 3 presented below:

TABLE 3

```
DMRS-UplinkConfig : :=   SEQUENCE {
   dmrs-Type (DMRS type configuration)              ENUMERATED {type2}
OPTIONAL,   -- Need S
   dmrs-AdditionalPosition (additional DMRS OFDM symbol configuration)
ENUMERATED {pos0, pos1, pos3}                       OPTIONAL,   --
Need R
   phaseTrackingRS (PTRS configuration)             SetupRelease { PTRS-
UplinkConfig }          OPTIONAL,    -- Need M
   maxLength (1 symbol or 2symbol DMRS pattern related configuration)
ENUMERATED {len2}                                   OPTIONAL,   --
Need S
   transformPrecodingDisabled      SEQUENCE {
      scramblingID0 (scramblingID0)                 INTEGER (0..65535)
OPTIONAL,   -- Need S
      scramblingID1 (scramblingID0)                 INTEGER (0..65535)
OPTIONAL,   -- Need S
    . . .
   }
OPTIONAL,   -- Need R
   transformPrecodingEnabled       SEQUENCE {
      nPUSCH-Identity (cell ID for DFT-s-OFDM)      INTEGER(0..1007)
OPTIONAL,   -- Need S
      sequenceGroupHopping (sequence group hopping)    ENUMERATED
{disabled} OPTIONAL,    -- Need S
      sequenceHopping (sequence hopping)            ENUMERATED {enabled}
OPTIONAL,   -- Need S
    . . .
   }
OPTIONAL,   -- Need R
 . . .
}
```

Figure 4:
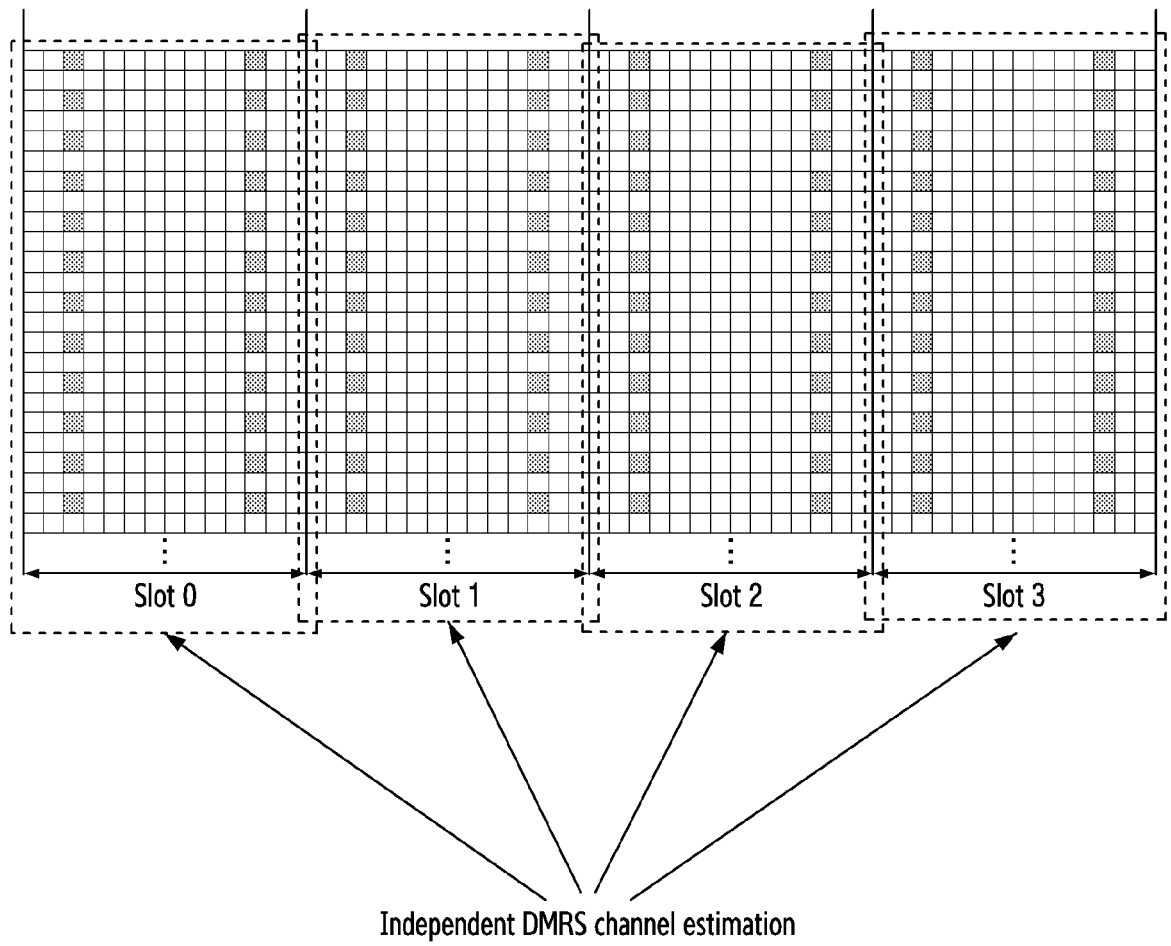
FIG. 4 is a view illustrating an example of channel estimation which uses a DMRS received through one physical uplink shared channel (PUSCH) in a time domain in a wireless communication system according to an embodiment of the disclosure.

FIG. 4 illustrates an example of channel estimation which uses a DMRS received through one PUSCH in a time band in a wireless communication system according to an embodiment of the disclosure.

Referring to FIG. 4, it is a view illustrating an example of channel estimation which uses a DMRS received through one PUSCH in a time band in a 5G system.

In performing channel estimation for decoding data by using the above-described DMRS, physical resource blocks (PRB) bundling interlocking with a system band may be used in a frequency band and channel estimation may be performed within a precoding resource block group which is a corresponding bundling unit. In addition, channel estimation may be performed on a time basis on the assumption that only the DMRS received through one PUSCH undergoes the same precoding.

Figure 5:
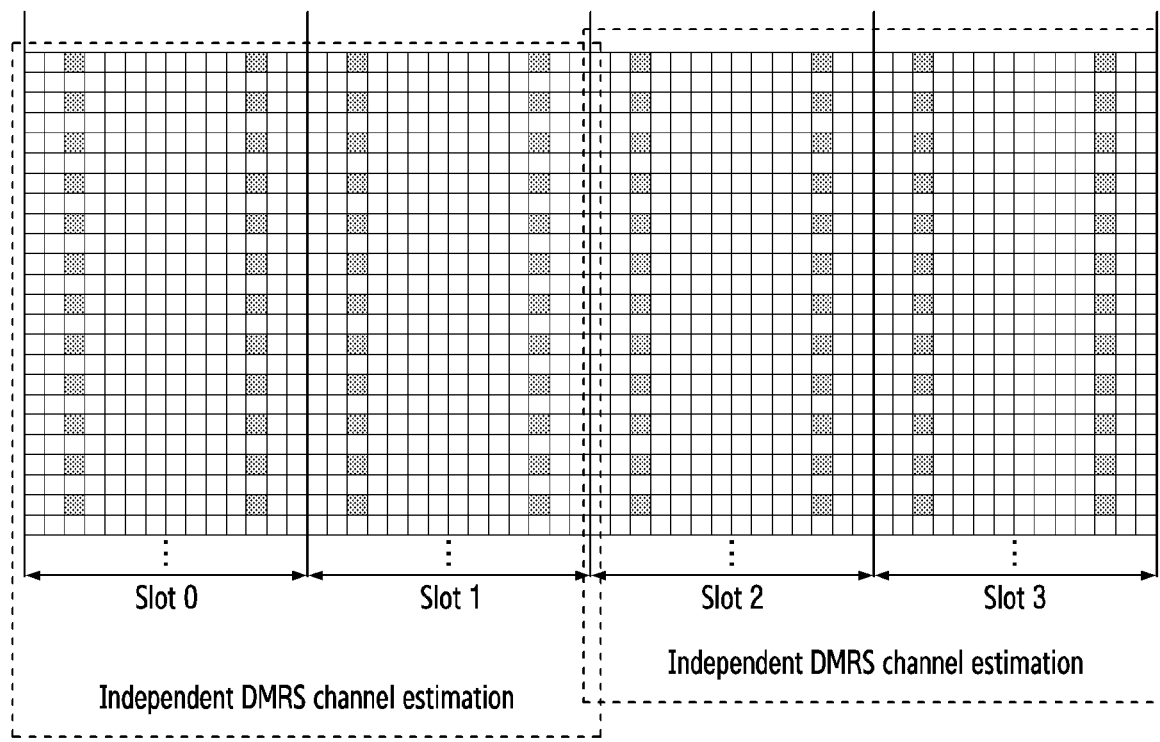
FIG. 5 is a view illustrating an example of joint channel estimation which uses a DMRS received through a plurality of PUSCHs in a time domain in a wireless communication system according to an embodiment of the disclosure.

FIG. 5 illustrates an example of joint channel estimation which uses a DMRS received through a plurality of PUSCHs in a time band in a wireless communication system according to an embodiment of the disclosure.

Referring to FIG. 5, it is a view illustrating an example of joint channel estimation which uses a DMRS received through a plurality of PUSCHs in a time band of a 5G system, to which various embodiments of the disclosure are applicable.

A base station may indicate whether a terminal uses the same precoding through a configuration, and, based on this indication, the base station may perform channel estimation by using DMRS transmissions using the same precoding, and may enhance DMRS channel estimation performance.

In the same way as in FIG. 4, in performing channel estimation for decoding data by using the above-described DMRS in the embodiment of FIG. 5, PRB bundling interlocking with a system band may be used in a frequency band, and channel estimation may be performed within a PRG which is a corresponding bundling unit. In addition, channel estimation may be performed on a time basis on the assumption that only the DMRS received through one or more PUSCHs undergoes the same precoding. Since it is possible to perform channel estimation based on various DMRSs in the time band, channel estimation performance may be enhanced. In particular, even when data decoding performance is good, channel estimation performance may encounter a bottleneck in enhancing a coverage, and therefore, channel estimation performance may be very important.

Hereinafter, a time domain resource allocation method for a data channel in a 5G communication system will be described. A base station may configure a table regarding time domain resource allocation information for a downlink data channel (physical downlink shared channel (PDSCH)) and an uplink data channel (PUSCH) for a terminal through higher layer signaling (for example, RRC signaling).

The base station may configure a table that is formed of at most 17 (=maxNrofDL-Allocations) entries for the PDSCH, and may configure a table that is formed of at most 17 (=maxNrofUL-Allocations) entries for the PUSCH. The time domain resource allocation information may include, for example, a PDCCH-to-PDSCH slot timing (corresponding to a time interval in a slot unit between a time at which a PDCCH is received and a time at which a PDSCH scheduled by the received PDCCH is transmitted, expressed by K0), or a PDCCH-to-PUSCH slot timing (corresponding to a time interval in a slot unit between a time at which a PDCCH is received and a time at which a PUSCH scheduled by the received PDCCH is transmitted, expressed by K2), information regarding a position and a length of a start symbol in which the PDSCH or PUSCH is scheduled within a slot, a mapping type of the PDSCH or PUSCH. For example, time domain resource allocation information regarding the PDSCH may be configured for the terminal through RRC signaling as shown in Table 4 presented below:

TABLE 4

```
PDSCH-TimeDomainResourceAllocationList information element
PDSCH-TimeDomainResourceAllocationList : :=    SEQUENCE (SIZE(1..maxNrofDL-Allocations))
OF PDSCH-TimeDomainResourceAllocation
PDSCH-TimeDomainRescurceAllocation : :=   SEQUENCE {
   k0                                            INTEGER(0..32)
OPTIONAL,     -- Need S
       (PDCCH-to-PDSCH timing, slot unit)
mappingType                      ENUMERATED {typeA, typeB},
       (PDSCH mapping type)
startSymbolAndLength             INTEGER (0..127)
(start symbol and length of PDSCH)
}
```

In addition, for example, time domain resource allocation information regarding the PUSCH may be configured for the terminal through RRC signaling as shown in Table 5 presented below:

TABLE 5

```
PUiXS-TimeDomainResourceAllocation information element
PUSCH-TimeDomainResourceAllocationList : :=    SEQUENCE (SIZE(1..maxNrofUL-Allocations)) OF
PUSCH-TimeDomainResourceAllocation
PUSCH-TimeDomainRescurceAllocation : := SEQUENCE {
   k2                             INTEGER(0..32)      OPTIONAL, -- Need S
     (PDCCH-to-PUSCH timing, slot unit)
   mappingType                    ENUMERATED {typeA, typeB},
     (PUSCH mapping type)
   startSymbolAndLength           INTEGER (0..127)
     (start symbol and length of PUSCH)
}
```

The base station may transmit one of the entries of the table regarding the time domain resource allocation information to the terminal through L1 signaling (for example, downlink control information (DCI)). For example, the base station may indicate one of the entries of the table regarding the time domain resource allocation information, with a 'time domain resource allocation' field in the DCI. The terminal may acquire the time domain resource allocation information regarding the PDSCH or the PUSCH, based on the DCI received from the base station.

Hereinafter, transmission of a PUSCH in a 5G system will be described in detail. The PUSCH transmission may be dynamically scheduled by a UL grant within DCI, or may be operated by configured grant type 1 or configured grant type 2. Dynamic scheduling for the PUSCH transmission may be indicated by DCI format 0_0 or 0_1.

The PUSCH transmission of configured grant type 1 may be configured semi-statically through reception of configuredGrantConfig including rrc-ConfiguredUplinkGrant of Table 6 through higher signaling, without receiving a UL grant within DCI. The PUSCH transmission of configured grant type 2 may be scheduled semi-continuously by a UL grant in DCI, after reception of configuredGrantConfig that does not include rrc-ConfiguredUplinkGrant of Table 6 through higher signaling. When PUSCH transmission is operated by a configured grant, parameters applied to the PUSCH transmission may be applied through configuredGrantConfig which is higher signaling of Table 6, except for specific parameters provided in pusch-Config of Table 7, which is higher signaling (for example, dataScramblingIdentityPUSCH, txConfig, codebookSubset, maxRank, scaling of UCI-OnPUSCH, etc.). For example, if the terminal receives transformPrecoder in configuredGrantConfig which is higher signaling of Table 6, the terminal may apply tp-pi2BPSK in pusch-Config of Table 7 to PUSCH transmission operating by a configured grant.

TABLE 6

| ConfiguredGrantConfig |
| --- |

```
ConfiguredGrantConfig ::=       SEQUENCE {
    frequencyHopping                    ENUMERATED {intraSlot, interSlot}
OPTIONAL,     -- Need S,
    cg-DMRS-Configuration       DMRS-UplinkConfig,
    mcs-Table                           ENUMERATED {qam256 , qam64LowSE}
OPTIONAL,     -- Need S
    mcs-TableTransformPrecoder          ENUMERATED {qam26, qam4LowSE}
OPTIONAL, -- Need S
    uci-OnPUSCH                         SetupRelease { CG-UCI-OnPUSCH }
OPTIONAL,     -- Need M
    resourceAllocation                  ENUMERATED { resourceAllocationType0,
resourceAllocationType1, dynamicSwitch },
    rbg-Size                            ENUMERATED {config2}
OPTIONAL,     -- Need S
    powerControlLoopToUse       ENUMERATED {n0, n1},
    p0-PUSCH-Alpha              P0-PUSCH-AlphaSetId,
    transformPrecoder                   ENUMERATED {enabled, disabled}
OPTIONAL,     -- Need S
    nrofHARQ-Processes          INTEGER (1..17),
    repK                        ENUMERATED {n1, n2, n4, n8},
    repK-RV                             ENUMERATED {s1-0231, s2-0303, s3-0000}
OPTIONAL,     -- Need R
    periodicity                 ENUMERATED {
                                    sym2, sym7, sym1x14, sym2x14, sym4x14,
sym5x14, sym8x14, sym10x14, sym17x14, sym20x14,
                                    sym32x14, sym40x14, sym64x14, sym80x14,
sym128x14, sym170x14, sym256x14, sym320x14, sym512x14,
                                    sym640x14, sym1024x14, sym1280x14,
sym2560x14 , sym5120x14,
                                    sym6, sym1x12, sym2x12, sym4x12, sym5x12,
sym8x12, sym10x12, sym17x12, sym20x12, sym32x12,
                                    sym40x12, sym64x12, sym80x12, sym128x12,
sym170x12, sym256x12, sym320x12, sym512x12, sym640x12,
                                    sym1280x12, sym2560x12
    },
    configuredGrantTimer                INTEGER (1..64)
OPTIONAL,     -- Need R
    rrc-ConfiguredUplinkGrant   SEQUENCE {
        timeDomainOffset            INTEGER (0..5119),
        timeDomainAllocation        INTEGER (0. .16),
        frequencyDomainAllocation   BIT STRING (SIZE(18)),
        antennaPort                 INTEGER (0..31),
        dmrs-SeqInitialization              INTEGER (0..1)
OPTIONAL,     -- Need R
        precodingAndNumberOfLayers  INTEGER (0..63),
        srs-ResourceIndicator               INTEGER (0..16)
OPTIONAL,     -- Need R
        mcsAndTBS                   INTEGER (0..31),
        frequencyHoppingOffset              INTEGER (1..maxNrofPhysicalResourceBlocks-
1)        OPTIONAL,     -- Need R
        pathlossReferenceIndex              INTEGER (0..maxNrofPUSCH-
PathlossReferenceRSs-1),
    ...
    }
OPTIONAL,     -- Need R
    ...
}
```

Next, a PUSCH transmission method will be described. A DMRS antenna port for PUSCH transmission may be the same as an antenna port for SRS transmission. The PUSCH transmission may follow a codebook-based transmission method and a non-codebook-based transmission method according to whether a value of txConfig in pusch-Config of Table 7, which is higher signaling, indicates a 'codebook' or a 'non-codebook'. As described above, PUSCH transmission may be dynamically scheduled through DCI format 0_0 or 0_1, and may be semi-statically configured by a configured grant.

If a terminal receives an indication of scheduling of PUSCH transmission through DCI format 0_0, the terminal may perform beam configuration for PUSCH transmission by using pucch-spatialRelationInfoID corresponding to a UE-specific, dedicated PUCCH resource having a lowest ID within an uplink bandwidth part (BWP) activated in a serving cell. In this case, the PUSCH transmission may be performed based on a single antenna port. The terminal may not expect scheduling for PUSCH transmission through DCI format 0_0 within a BWP in which a PUCCH resource including pucch-spatialRelationInfo is not configured. If the terminal does not receive a configuration of txConfig in pusch-Config of Table 7, the terminal may not expect scheduling with DCI format 0_1.

TABLE 7

PUSCH-Config

```
PUSCH-Config : :=                    SEQUENCE {
    dataScramblingIdentityPUSCH      INTEGER (0..1023)                    OPTIONAL,
-- Need S
    txConfig                         ENUMERATED {codebook, nonCodebook}   OPTIONAL,
-- Need S
    dmrs-UplinkForPUSCH-MappingTypeA SetupRelease { DMRS-UplinkConfig }    OPTIONAL, -
- Need M
dmrs-UplinkForPUSCH-MappingTypeB     SetupRelease { DMRS-UplinkConfig }    OPTIONAL, -
- Need M
    pusch-Power Control                                                   PUSCH-Power Control
OPTIONAL,    -- Need M
    frequencyHopping                 ENUMERATED {intraSlot, interSlot}    OPTIONAL,
-- Need S
frequencyHoppingOffsetLists          SEQUENCE   (SIZE   (1..4))  OF   INTEGER   (1..
maxNrofPhysicalResourceBlocks-1)
OPTIONAL,    -- Need M
    resourceallocation               ENUMERATED { resourceAllocationType0,
resourceAllocationType1, dynamicSwitch},
    pusch-TimeDomainAllocationList                SetupRelease     { PUSCH-
TimeDomainResourceAllocationList }   OPTIONAL,    -- Need M
    pusch-AggregationFactor   ENUMERATED { n2, n4, n8 }   OPTIONAL,   -- Need S
    mcs-Table    ENUMERATED {qam256, qam64LowSE}    OPTIONAL,    — Need S
    mcs-TableTransformPrecoder        ENUMERATED   {qam256,     qam64LowSE}
OPTIONAL,   -- Need S
    transformPrecoder                ENUMERATED   {enabled,  disabled}
OPTIONAL,   -- Need S
    codebookSubset                   ENUMERATED   {fullyAndPartialAndNonCoherent,
partialAndNonCoherent,noncoherent}
            OPTIONAL, -- Cond codebookBased
    maxRank                          INTEGER (1..4) OPTIONAL, -- Cond codebookBased
    rbg-Size                         ENUMERATED { config2}                OPTIONAL,
-- Need S
    uci-OnPUSCH                      SetupRelease { UCI-OnPUSCH}          OPTIONAL, --
Need M
    tp-pi2BPSK                       ENUMERATED {enabled}                 OPTIONAL,
-- Need S
    . . .
}
```

Next, codebook-based PUSCH transmission will be described. The codebook-based PUSCH transmission may be dynamically scheduled through DCI format 0_0 or 0_1, and may be semi-statically operated by a configured grant. When codebook-based PUSCH transmission is dynamically scheduled through DCI format 0_1 or is semi-statically configured by a configured grant, the terminal may determine a precoder for PUSCH transmission, based on an SRS resource indicator (SRI), a transmission precoding matrix indicator (TPMI), and a transmission rank (that is, the number of PUSCH transmission layers).

In this case, the SRI may be given through a field SRS resource indicator within DCI or may be configured through srs-ResourceIndicator which is higher signaling. The terminal may receive a configuration of at least one SRS resource at the time of codebook-based PUSCH transmission, and for example, may receive a configuration of at most two SRS resources. When the terminal receives an SRI through DCI, an SRS resource indicated by the corresponding SRI may refer to an SRS resource corresponding to the SRI, among SRS resources transmitted earlier than a PDCCH including the corresponding SRI. In addition, the TPMI and the transmission rank may be given through field precoding information and the number of layers in DCI, or may be configured through precodingAndNumberOfLayers which is higher signaling. The TPMI may be used to indicate a precoder which is applied to PUSCH transmission.

The precoder to be used for PUSCH transmission may be selected from an uplink codebook that has the same number of antenna ports as an nrofSRS-Ports value in SRS-Config, which is higher signaling. In the codebook-based PUSCH transmission, the terminal may determine a codebook subset based on the TPMI and codebookSubset within pusch-Config which is higher signaling. In this case, codebookSubset in pusch-Config which is higher signaling may be configured to one of 'fullyAndPartialAndNonCoherent', 'partialAndNonCoherent', or 'nonCoherent', based on a UE capability of the terminal to report to the base station.

If the terminal reports 'partialAndNonCoherent' with the UE capability, the terminal may not expect that the value of codebookSubset which is higher signaling is configured to 'fullyAndPartialAndNonCoherent.' If the terminal reports 'nonCoherent' with the UE capability, the terminal may not expect that the value of codebookSubset which is higher signaling is configured to 'fullyAndPartialAndNonCoherent' or 'partialAndNonCoherent.' When nrofSRS-Ports in SRS-ResourceSet which is higher signaling indicates two SRS antenna ports, the terminal may not expect that the value of codebookSubset which is higher signaling is configured to 'partialAndNonCoherent'.

The terminal may receive a configuration of one SRS resource set in which a value of usage within SRS-ResourceSet, which is higher signaling, is configured to 'codebook', and one SRS resource in the corresponding SRS resource set may be indicated through the SRI. If various SRS resources are configured within the SRS resource set in which the value of usage in SRS-ResourceSet which is higher signaling is configured to 'codebook', the terminal may expect that values of nrofSRS-Ports in SRS-Resource which is higher signaling are the same values for all SRS resources.

The terminal may transmit, to the base station, one or a plurality of SRS resources included in the SRS resource set in which the value of usage is configured to 'codebook' according to higher signaling, and the base station may select one of the SRS resources transmitted by the terminal, and may instruct the terminal to perform PUSCH transmission by using transmission beam information of the corresponding SRS resource. In this case, in the codebook-based PUSCH transmission, the SRI may be used as information for selecting an index of one SRS resource and may be included in DCI. Additionally, the base station may include information indicating the TPMI and the rank to be used by the terminal for PUSCH transmission in DCI, and may transmit the DCI. The terminal may perform PUSCH transmission by using an SRS resource indicated by the SRI, and applying a precoder indicated by the TPMI and the rank which are indicated based on a transmission beam of the corresponding SRS resource.

Next, non-codebook-based PUSCH transmission will be described. The non-codebook-based PUSCH transmission may be dynamically scheduled through DCI format 0_0 or 0_1, or may semi-statically operate by a configured grant. When at least one SRS resource is configured within an SRS resource set in which a value of usage within SRS-ResourceSet which is higher signaling is configured to 'nonCodeBook', the terminal may receive scheduling of non-codebook-based PUSCH transmission through DCI format 0_1.

With respect to the SRS resource set in which the value of usage within SRS-ResourceSet which is higher signaling is configured to 'nonCodebook', the terminal may receive a configuration of a non-zero power (NZP) CSI-RS resource associated with one SRS resource set. The terminal may perform calculation with respect to a precoder for SRS transmission, by measuring the NZP CSI-RS resource configured in association with the SRS resource set. If a difference between a last reception symbol of an aperiodic NZP CSI-RS resource associated with the SRS resource set, and a first symbol of aperiodic SRS transmission in the terminal is less than a specific symbol (for example, 42 symbols), the terminal may not expect that information regarding the precoder for SRS transmission is refined.

When a value of resourceType in SRS-ResourceSet which is higher signaling is configured to 'aperiodic', the NZP CSI-RS associated with the SRS-ResourceSet may be indicated by an SRS request which is a field within DCI format 0_1 or 1_1. In this case, when the NZP CSI-RS resource associated with SRS-ResourceSet is an aperiodic NZP CSI-RS resource and a value of the field SRS request in DCI format 0_1 or 1_1 is not '00', it may be indicated that there exists NZP CSI-RS associated with SRS-ResourceSet. In this case, the corresponding DCI should not indicate cross carrier or cross BWP scheduling. In addition, if the value of the SRS request indicates existence of the NZP CSI-RS, the corresponding NZP CSI-RS may be positioned in a slot in which a PDCCH including the SRS request field is transmitted. In this case, TCI states configured in a scheduled subcarrier may not be configured to QCL-TypeD.

If a periodic or semi-static SRS resource set is configured, the NZP CSI-RS associated with the SRS resource set may be indicated through associatedCSI-RS in SRS-ResourceSet which is higher signaling. With respect to non-codebook-based transmission, the terminal may not expect that associatedCSI-RS in spatialRelationInfo which is higher signaling for the SRS resource and SRS-ResourceSet which is higher signaling is configured.

When the terminal receives a configuration of a plurality of SRS resources, the terminal may determine a precoder and a transmission rank to apply to PUSCH transmission, based on an SRI indicated by the base station. In this case, the SRI may be indicated through a field SRS resource indicator in DCI or may be configured through srs-ResourceIndicator which is higher signaling. Like in the above-described codebook-based PUSCH transmission, when the terminal receives an SRI through DCI, an SRS resource indicated by the corresponding SRI may refer to an SRS resource corresponding to the SRI, among SRS resources transmitted earlier than a PDCCH including the corresponding SRI. The terminal may use one or a plurality of SRS resources for SRS transmission, and the maximum number of SRS resources which may be transmitted simultaneously in the same symbol within one SRS resource set may be determined by the UE capability of the terminal to report to the base station. In this case, SRS resources that the terminal transmits simultaneously may occupy the same RB. The terminal may configure one SRS port for each SRS resource. Only one SRS resource set in which the value of usage in SRS-ResourceSet which is higher signaling is configured to 'nonCodebook' may be configured, and the number of SRS resources for non-codebook-based PUSCH transmission may be configured to 4 to the maximum.

The base station may transmit one NZP CSI-RS associated with the SRS resource set to the terminal, and the terminal may calculate a precoder to be used for transmission of one or a plurality of SRS resources within a corresponding SRS resource, based on a result of measuring when the corresponding NZP CSI-RS is received. The terminal may apply the calculated precoder when transmitting one or the plurality of SRS resources in the SRS resource set in which the usage is configured to 'nonCodebook' to the base station, and the base station may select one or a plurality of SRS resources from the received one or plurality of SRS resources. In this case, in the non-codebook-based PUSCH transmission, the SRI may indicate an index expressing a combination of one or a plurality of SRS resources, and the SRI may be included in DCI. In this case, the number of SRS resources indicated by the SIR transmitted by the base station may be the number of transmission layers of PUSCH, and the terminal may transmit the PUSCH by applying the precoder applied to SRS resource transmission to each layer.

Next, a PUSCH repetitive transmission will be described. When a terminal receives scheduling of PUSCH transmission in DCI format 0_1 within a PDCCH, which includes CRC scrambled into C-RNTI, MCS-C-RNTI, or CS-RNTI, if the terminal receives a configuration of higher layer signaling pusch-AggregationFactor, the same symbol allocation may be applied to as many continuous slots as pusch-AggregationFactor, and PUSCH transmission may be limited to single rank transmission. For example, the terminal should repeat the same transport block (TB) in as many continuous slots as pusch-AggregationFactor, and should apply the same symbol allocation to each slot. Table 8 shows a redundancy version (RV) applied to PUSCH repetitive transmission in each slot. If the terminal receives scheduling of PUSCH repetitive transmission in DCI format 0_1 in a plurality of slots, and at least one symbol of slots in which PUSCH repetitive transmission is performed is indicated as a downlink symbol according to information of higher layer signaling tdd-UL-DL-ConfigurationComma or tdd-UL-DL-ConfigurationDedicated, the terminal may not perform PUSCH transmission in a slot where the corresponding symbol is positioned.

TABLE 8

| rv_id indicated by the DCI | rv_id to be applied to n$^{th}$ transmission occasion | | | |
|---|---|---|---|---|
| scheduling the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel (PUSCH) in a 5G system will be described in detail. The 5G system supports two types of repetitive transmission of an uplink data channel, that is, a PUSCH repetitive transmission type A and a PUSCH repetitive transmission type B. The terminal may receive a configuration of one of the PUSCH repetitive transmission type A or B through higher layer signaling.

PUSCH Repetitive Transmission Type A

As described above, a start symbol and a length of an uplink data channel are determined in one slot according to the time domain resource allocation method, and a base station may transmit the number of repetitive transmissions to the terminal through higher layer signaling (for example, RRC signaling) or L1 signaling (for example, DCI).

The terminal may repeatedly transmit an uplink data channel that has the same start symbol and length as the configured uplink data channel in continuous slots, based on the received number of repetitive transmissions. In this case, when at least one symbol in a slot that the base station configures as a downlink for the terminal, or in a slot for repetitive transmission of an uplink data channel configured for the terminal is configured to a downlink, the terminal may omit the uplink data channel transmission in the corresponding slot. That is, the uplink data channel transmission may be included in the number of uplink data channel repetitive transmissions, but may not be performed.

PUSCH Repetitive Transmission Type B

As described above, a start symbol and a length of an uplink data channel is determined in one slot according to the time domain resource allocation method, and a base station may transmit the number of repetitive transmissions numberofrepetitions to the terminal through higher signaling (for example, RRC signaling) or L1 signaling (for example, DCI).

Based on the start symbol and the length of the uplink data channel configured as described above, a nominal repetition of the uplink data channel may be determined as follows. Herein, the nominal repetition may refer to a resource of a symbol which is configured by the base station for PUSCH repetitive transmission, and the terminal may determine a resource to be used for an uplink in the configured nominal repetition. In this case, a slot in which the n-th nominal repetition starts may be given by $$K_s + \left\lfloor \frac{S + n \cdot L}{N_{symb}^{slot}} \right\rfloor,$$

and a symbol in which the nominal repetition starts in the start slot may be given by mod(S+n·L, N$_{symb}^{slot}$). A slot in which the n-th nominal repetition ends may be given by $$K_s + \left\lfloor \frac{S + (n+1) \cdot L - 1}{N_{symb}^{slot}} \right\rfloor,$$

and a symbol in which the nominal repetition ends in the last slot may be given by mod(S+(n+1)·L−1, N$_{symb}^{slot}$). Herein, n=0, . . . , numberofrepetition−1, S may indicate a start symbol of a configured uplink data channel, and L may indicate a symbol length of the configured uplink data channel. K$_s$ may indicate a slot in which PUSCH transmission starts, and N$_{symb}^{slot}$ may indicate the number of symbols per slot.

The terminal determines an invalid symbol for the PUSCH repetitive transmission type B. A symbol configured to a downlink by tdd-UL-DL-Configuration-Common or tdd-UL-DL-ConfigurationDedicated may be determined as an invalid symbol for the PUSCH repetitive transmission type B. Additionally, the invalid symbol may be configured based on a higher layer parameter (for example, InvalidSymbolPattern). For example, the higher layer parameter (for example, InvalidSymbolPattern) may configure an invalid symbol by providing a symbol level bitmap over one slot or two slots. In this case, 1 displayed on the bitmap may indicate an invalid symbol. Additionally, a cycle and a pattern of the bitmap may be configured through the higher layer parameter (for example, periodicityAndPattern). If the higher layer parameter (for example, InvalidSymbolPattern) is configured and InvalidSymbolPatternIndicator-ForDCIFormat0_1 or InvalidSymbolPatternIndicator-ForDCIFormat0_2 parameter indicates 1, the terminal may apply the invalid symbol pattern, and, if InvalidSymbolPatternIndicator-ForDCIFormat0_1 or InvalidSymbolPatternIndicator-ForDCIFormat0_2 parameter indicates 0, the terminal may not apply the invalid symbol pattern. Alternatively, if the higher layer parameter (for example, InvalidSymbolPattern) is configured and InvalidSymbolPatternIndicator-ForDCIFormat0_1 or InvalidSymbolPatternIndicator-ForDCIFormat0_2 parameter is not configured, the terminal may apply the invalid symbol pattern.

After determining the invalid symbol in each nominal repetition, the terminal may consider symbols except for the determined invalid symbol as valid symbols. If one or more valid symbols are included in each nominal repetition, the nominal repetition may include one or more actual repetitions. Herein, each actual repetition may refer to a symbol that is actually used for PUSCH repetitive transmission among symbols configured to the configured nominal repetition, and may include a continuous set of valid symbols which are used for the PUSCH repetitive transmission type B in one slot. If actual repetition having one symbol is configured to be valid except for a case where a symbol length of the configured uplink data channel L is 1, the terminal may omit actual repetition transmission. A redundancy version (RV) is applied according to a redundancy version pattern which is configured for every n-th actual repetition.

Figure 6:
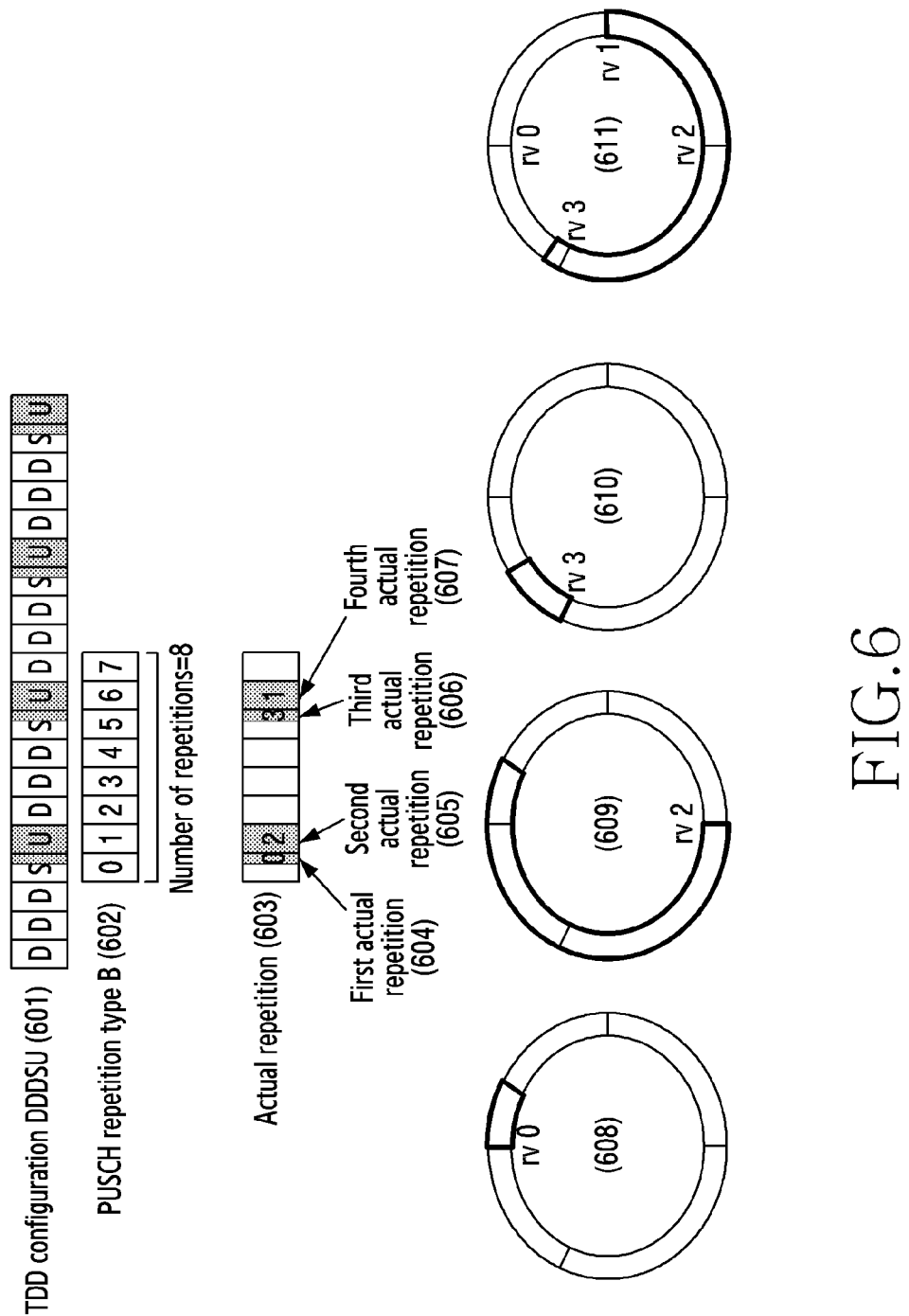
FIG. 6 is a view illustrating an example of a PUSCH repetitive transmission type B in a wireless communication system according to an embodiment of the disclosure.

FIG. 6 illustrates an example of the PUSCH repetitive transmission type B in a wireless communication system according to an embodiment of the disclosure.

Referring to FIG. 6, it illustrates an embodiment of the PUSCH repetitive transmission type B in a 5G system. A terminal may configure a frame structure of time division duplexing (TDD) to include three downlink slots, one special/flexible slot, one uplink slot. Herein, when the special/flexible slot includes 11 downlink symbols and 3 uplink symbols, an initial transmission slot in a second uplink transmission may be in the third place, and, when the terminal receives a configuration indicating that an index of a start symbol of an uplink data channel is 0 and a length of the uplink data channel is 14, and the number of repetitive transmissions repK is 8, a nominal repetition may appear in 8 continuous slots from the initial transmission slot (602). Thereafter, the terminal may determine a symbol that is configured to a downlink symbol in the frame structure 601 of the TDD system in each nominal repetition, as an invalid symbol, and, when valid symbols include one or more continuous symbols in one slot, actual repetition may be configured and a data channel may be transmitted (603). Accordingly, four (repK_actual=4) PUSCHs may be actually transmitted. In this case, when repK-RV is configured to 0-2-3-1, RV in the PUSCH of the first resource 604 actually transmitted is 0, RV in the PUSCH of the second resource 605 actually transmitted is 2, RV in the PUSCH of the third resource 606 actually transmitted is 3, and RV in the PUSCH of the fourth resource 607 actually transmitted is 1. In this case, only the PUSCH having RV of 0 and RV of 3 has a value that is decoded by itself, and in the case of the first resource 604 and the third resource 606, the PUSCH is transmitted only in three symbols which are even less than an actually configured symbol length (14 symbols), and accordingly, a length 608, 610 of bit that is rate-matched is shorter than a bit length 609, 611 calculated by a configuration.

Figure 7:
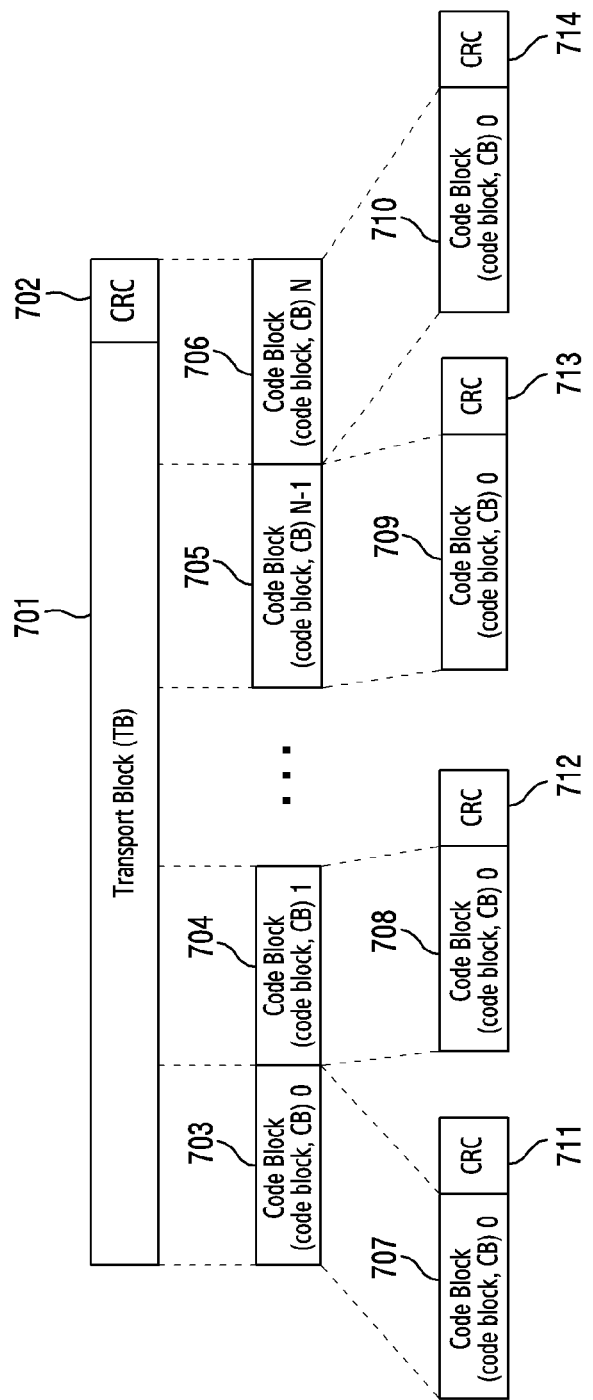
FIG. 7 is a view illustrating an example of a process of segmenting a transport block into a plurality of code blocks and adding cyclical redundancy check (CRC) in a wireless communication system according to an embodiment of the disclosure.

FIG. 7 illustrates an example of a process of segmenting a transport block into a plurality of code blocks and adding CRC in a wireless communication system according to an embodiment of the disclosure.

Specifically, FIG. 7 illustrates an embodiment of a process of segmenting a transport block (TB) into a plurality of code blocks (CBs), and adding CRC in a 5G communication system.

Referring to FIG. 7, a CRC 702 may be added to a tail or head portion of one transport block TB 701 to be transmitted in an uplink or a downlink. The CRC 702 may have 16 bits or 24 bits, or a pre-fixed number of bits, or may have a variable number of bits according to a channel condition, and may be used to determine whether channel coding succeeds. The block in which the CRC 702 is added to the TB 701 may be segmented into a plurality of CBs 703, 704, 705, 706. In this case, a maximum size of the CB may be pre-defined, and in this case, the last CB 706 may have a size smaller than the other CBs 703, 704, 705. However, this is merely an example, and according to another example, 0, a certain value, or 1 may be inserted into the last CB 706, such that the last CB 706 and the other CBs 703, 704, 705 have the same length. In addition, CRCs 711, 712, 713, 714 may be added to CBs 707, 708, 709, 710, respectively. The CRCs 711, 712, 713, 714 may have 16 bits or 24 bits or a pre-fixed number of bits, and may be used to determine whether channel coding succeeds. In order to generate the CRC 702, the TB 701 and a cyclic generator polynomial may be used. The cyclic generator polynomial may be defined in various methods. For example, on the assumption that a cyclic generator polynomial for a 24-bit CRC is g CRC24A(D)=D24+D23+D18+D18+D14+D11+D10+D7+D6+D5+D4+D3+D+1, if L=24, CRC $p_1, p_2, \ldots, p_{L-1}$ regarding TB data $a_0, a_1, a_2, a_3, \ldots, a_{A-1}$ may be determined to be a value that has the remainder of 0 when $a_0 D^{A+23}+ a_1 D^{A+22}+ \ldots + a_{A-1} D^{24} + p_0 D^{23} + p_1 D^{22} + \ldots + p_{22} D^1 + p_{23}$ is divided by gCRC24A(D), that is, $p_1, p_2, \ldots, p_{L-1}$. In the above-described example, it is illustrated that the CRC length L is 24, but the CRC length L may be determined to be various lengths like 12, 16, 24, 32, 40, 48, 64, etc. After the CRC is added to the TB through this process, the TB+CRC may be segmented into N number of CBs 703, 704, 705, 706. CRCs 711, 712, 713, 714 may be added to the segmented CBs 703, 704, 705, 706, respectively. The CRC added to the CB may have a different length from that when the CRC added to the TB is generated, or may be generated based on other cyclic generator polynomials. In addition, the CRC 702 added to the TB and the CRCs 711, 712, 713, 714 added to the CBs may be omitted according to a type of a CB applied to the CB. For example, when a low density parity code (LDPC) other than a turbo code is applied to the CB, the CRCs 711, 712, 713, 714 to be added to every CB may be omitted. However, even when the LDPC is applied, the CRCs 711, 712, 713, 714 may be added to the CBs as they are. In addition, even when a polar code is used, the CRC may be added or may be omitted. As described in the embodiment of FIG. 7, a maximum length of one CB of the TB to be transmitted may be determined according to a type of channel coding applied, and the TB and the CRC added to the TB may be segmented into CBs according to the maximum length of the CB. In a related-art LTE system, a CRC for a CB may be added to the segmented CB, and data bits and the CRC of the CB may be encoded into a channel code, and accordingly, coded bits are determined, and the number of bits rate-matching the respective coded bits may be determined as promised.

Hereinafter, a method of calculating a transport block size (TBS) in a 5G communication system will be described in detail.

The number of REs allocated to PUSCH mapping in one PRB within an allocated resource, $N'_{RE}$, is calculated. $N'_{RE}$ may be calculated by $N_{sc}^{RB} \times N_{symb}^{sh} - N_{DMRS}^{PRB} - N_{OH}^{PRB}$. Herein, $N_{sc}^{RB}$ may be 12 and $N_{symb}^{sh}$ may indicate the number of OFDM symbols allocated to a PUSCH. $N_{DMRS}^{PRB}$ is the number of REs in one PRB occupied by a DMRS of the same CDM group. $N_{oh}^{PRB}$ is the number of REs occupied by an overhead in one PRB configured by higher signaling, and may be configured to one of 0, 6, 12, 18. Thereafter, the number of REs allocated to the PUSCH, $N_{RE}$, may be calculated. $N_{RE}$ may be calculated by min (166, $N'_{RE}) \times n_{PRB}$, and $n_{PRB}$ indicates the number of PRBs allocated to a terminal. The number of temporary information bits, $N_{info}$, may be calculated by $N_{RE} \times R \times Q_m \times v$. Herein, R is a code rate and $Q_m$ is a modulation order, and information of these values may be transmitted by using an MCS bit field of DCI and a pre-defined table. In addition, v is the number of allocated layers. If $N_{info} \leq 3824$, a TBS may be calculated through the following process. In addition, the TBS may be calculated through step 4. $N'_{info}$ may be calculated through equations $$N'_{info} = \max\left(24, 2^n \times \left\lfloor \frac{N_{info}}{2^n} \right\rfloor\right)$$

and n=max $(3, \lfloor \log_2(N_{info}) \rfloor - 6)$. The TBS may be determined by a value that is closest to $N'_{info}$ among values that are not smaller than $N'_{info}$ in Table 9 presented below:

TABLE 9

| Index | TBS |
|---|---|
| 1 | 24 |
| 2 | 32 |

TABLE 9-continued

| Index | TBS |
|---|---|
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 20 | 256 |
| 27 | 272 |
| 28 | 288 |
| 29 | 301 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 981 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

If $N_{info} > 3824$, $N'_{info}$ may be calculated through equations $$N'_{info} = \max\left(3840, 2^n \times \text{round}\left(\frac{N_{info} - 24}{2^n}\right)\right)$$

and $n = \lfloor \log_2 (N_{info} - 24) \rfloor - 5$. The TBS may be determined through $N'_{info}$ and [pseudo-code 1] presented below. C presented below corresponds to the number of CBs included in one TB.

```
Pseudo-code 1 Start
  if R ≤ 1/4
```
$$TBS = 8 * C * \left\lceil \frac{N'_{info} + 24}{8 * C} \right\rceil - 24, \text{ where } C = \left\lceil \frac{N'_{info} + 24}{3816} \right\rceil$$
```
  else
    if N'_info > 8424
```
$$TBS = 8 * C * \left\lceil \frac{N'_{info} + 24}{8 * C} \right\rceil - 24, \text{ where } C = \left\lceil \frac{N'_{info} + 24}{8424} \right\rceil$$
```
    else
```
$$TBS = 8 * \left\lceil \frac{N'_{info} + 24}{8} \right\rceil - 24$$
```
    end if
  end if
Pseudo-code 1 End
```

Hereinafter, a PUSCH transmission/repetitive transmission control method according to a configuration of a cancellation indication (CI), a slot-format indication (SFI) and PUSCH/PUCCH overlapping in a 5G system will be described in detail.

Figure 8:
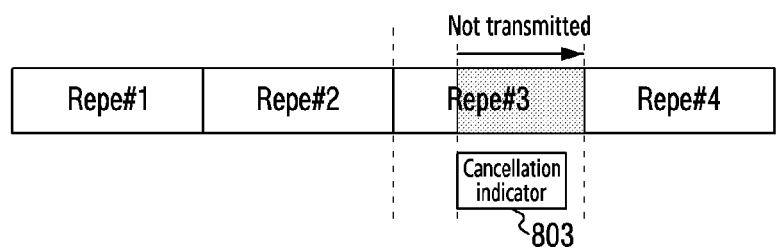
FIG. 8 is a view illustrating an example of PUSCH transmission/repetitive transmission according to cancellation indication (CI), slot-format indication (SFI) configuration and PUSCH/physical uplink control channel (PUCCH) overlapping in a wireless communication system according to an embodiment of the disclosure.
Figure 8:
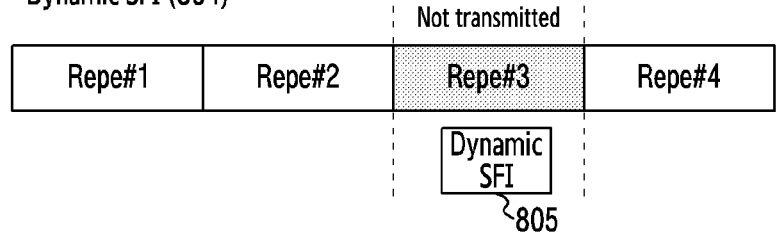
Figure 8:
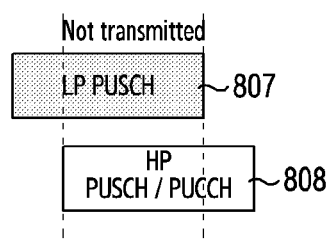

FIG. 8 illustrates an example of PUSCH transmission/repetitive transmission according CI, SFI configuration, and PUSCH/PUCCH overlapping in a wireless communication system according to an embodiment of the disclosure.

Referring to FIG. 8, it is a view illustrating PUSCH transmission/repetitive transmission 801 according to CI 802, SFI configuration and PUSCH/PUCCH overlapping in a 5G system. When a terminal receives DCI format 2_4 having ci-RNTI, the terminal may cancel PUSCH transmission or actual repetition. In this case, the terminal may cancel all symbols of configured PUSCH transmission from the earliest symbol of a symbol group which is configured to '1' of the received DCI format 2_4. In FIG. 8, when the terminal receives a configuration of PUSCH repetitive transmission through higher layer signaling and L1 signaling and receives a CI 803 in repe #3, the terminal cancels symbols from the earliest symbol of the CI in repe #3 to the last symbol of repe #3.

When the terminal receives a configuration of PUCCH, PUSCH, PRACH transmission through higher layer signaling and receives DCI format 2_0 including information regarding a format of a slot, the terminal may transmit the PUCCH, PUSCH, PRACH in a symbol group in which only slot format information included in DCI format 2_0 is configured to an uplink symbol of a slot. In FIG. 8, when the terminal receives a configuration of PUSCH repetitive transmission through higher layer signaling and L1 signaling and receives an SFI 805 through DCI format 2_0 in repe #3, if the SFI indicates a symbol of repe #3 as a downlink, the terminal may not transmit entire repe #3 including a downlink symbol 804.

The terminal may cancel PUSCH/PUCCH transmission having a low priority index, based on a high priority index regarding overlapping of PUSCH/PUCCH transmission having a different priority index. In FIG. 8, when a PUSCH transmission 807 which is configured to a low priority index (=0) through higher layer signaling (for example, phy-PriorityIndex) and L1 signaling (for example, priority indicator in DCI format 0_1/0_2) overlaps a PUSCH/PUCCH transmission 808 which is configured to a high priority index (=1), the terminal may not transmit the PUSCH including the low priority index (=0) 806. This is merely an example and is not limited to PUSCH transmission and may be applied to PUCCH transmission, PUSCH/PUCCH repetitive transmission.

Figure 9:
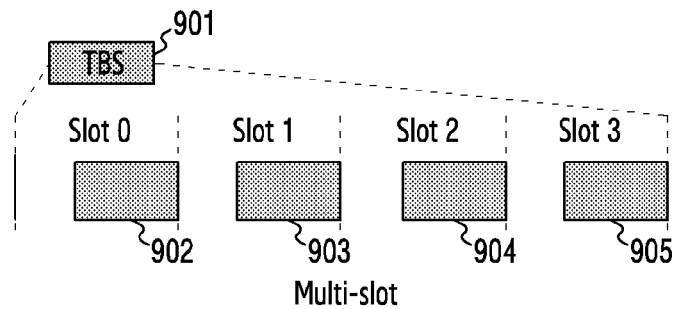
FIG. 9 is a view illustrating an example of transport block (TB) processing over multi-slot (TBoMS) PUSCH transmission in a wireless communication system according to an embodiment of the disclosure.
Figure 9:
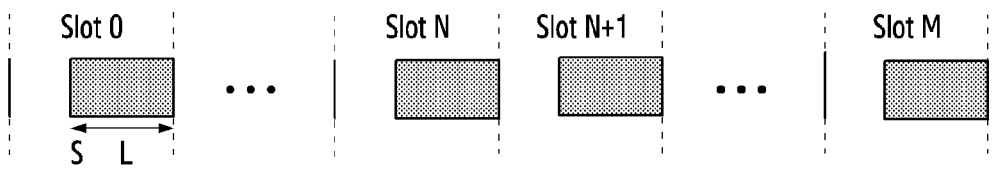
Figure 9:
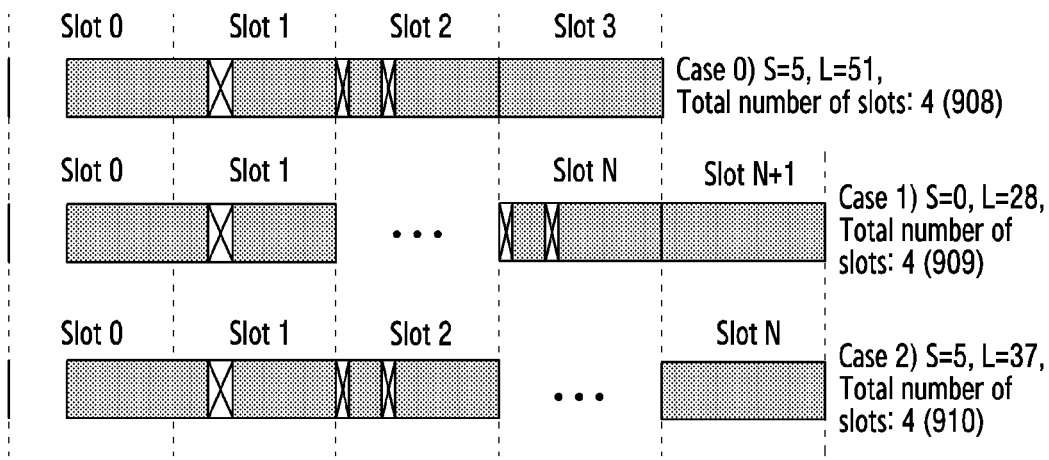

FIG. 9 illustrates an example of TB processing over multi-slot (TBoMS) PUSCH transmission in a wireless communication system according to an embodiment of the disclosure.

Referring to FIG. 9, it illustrates TBoMS PUSCH transmission in a 5G system. One TB 901 may be allocated to multiple slots 902, 903, 904, 905 and may be transmitted. In this case, instead of allocating multiple small TBs to resources of multiple slots 902, 903, 904, 905, one TB may be allocated, so that a ratio of CRC is reduced and a low code rate is obtained, and a channel coding gain is obtained and a coverage of a channel is enhanced. In addition, referring to FIG. 7, as a time domain resource allocation method of TBoMS PUSCH transmission, a method 906 of allocating time domain resources like the PUSCH repetitive transmission type A, and a method 907 of allocating time domain resources like the PUSCH repetitive transmission type B may be applied. When resources are allocated to the PUSCH for TBoMS like the PUSCH repetitive transmission type A, the PUSCH may be transmitted in multiple slots each of which has the same symbol resource. On the other hand, when time domain resources are allocated to the PUSCH for TBoMS like the PUSCH repetitive transmission type B, resources may be allocated according to a length L of a symbol which is configured through higher layer signaling and L1 signaling, like a case 0 908, a case 1 909, a case 2 910.

In various embodiments of the disclosure, a PUSCH transmission method when a CI, a dynamic SFI are configured in PUSCH transmission in which one TB is allocated to multiple slots, and multi-PUSCH transmission in which joint channel estimation is performed in a 5G communication will be described. In addition, a PUSCH transmission method according to overlapping with PUSCH/PUCCH transmission having a different priority index is provided. According to an embodiment of the disclosure, the PUSCH transmission method regarding the CI, the dynamic SFI, and overlapping between PUSCH/PUCCH transmissions having a different priority provides a flexible and optimized resource allocation method, and may be used to enhance an uplink coverage.

According to an embodiment of the disclosure, based on TBoMS PUSCH transmission and multi-PUSCH transmission in which joint channel estimation is performed, there is provided an operating method of a terminal for transmitting a PUSCH when CI, dynamic SFI configurations and overlapping between PUSCH/PUCCH transmissions having a different priority occur in PUSCH transmission in which one TB is transmitted through multiple slots, and in multi-PUSCH transmission in which joint channel estimation is performed, the method including: a step of receiving, from a base station, configuration information for PUSCH transmission in which one TB is transmitted through multiple slots, and for multi-PUSCH transmission in which joint estimation is performed; a step of receiving, from the base station, CI, dynamic SFI configuration information and PUSCH/PUCCH transmission configuration information having a different priority index; and a step of transmitting, to the base station, the PUSCH according to the configured information, based on the configured TBoMS configuration information, the configuration information of multi-PUSCH transmission in which joint estimation is performed, the CI, dynamic SFI configuration information, and the PUSCH/PUCCH transmission configuration information having a different priority index.

According to various embodiments of the disclosure, based on TBoMS PUSCH transmission in which one TB is transmitted through multiple slots and multi-PUSCH transmission in which joint channel estimation is performed, there is provided an operating method of a base station for controlling PUSCH transmission when CI, dynamic SFI configurations and overlapping between PUSCH/PUCCH transmissions having a different priority occur in TBoMS PUSCH transmission and in multi-PUSCH transmission in which joint channel estimation is performed, the method including: a step of transmitting, to a terminal, configuration information for PUSCH transmission in which one TB is transmitted through multiple slots, and for multi-PUSCH transmission in which joint estimation is performed; a step of transmitting, to the terminal, CI, dynamic SFI configuration information and PUSCH/PUCCH transmission configuration information having a different priority index; and a step of receiving, from the terminal, the PUSCH according to the configured information, based on the configured TBoMS configuration information, the configuration information of multi-PUSCH transmission in which joint estimation is performed, the CI, dynamic SFI configuration information, and the PUSCH/PUCCH transmission configuration information having a different priority index.

According to various embodiments of the disclosure, a PUSCH transmission method when a CI, a dynamic SFI are configured in PUSCH transmission in which one TB is allocated to multiple slots, and multi-PUSCH transmission in which joint channel estimation is performed will be described, and a PUSCH transmission method according to overlapping with PUSCH/PUCCH transmission having a different priority index will be described.

According to various embodiments of the disclosure, there is provided a PUSCH transmission method when a CI, a dynamic SFI are configured in PUSCH transmission in which one TB is allocated to multiple slots and multi-PUSCH transmission in which joint channel estimation is performed in a G5 system. In addition, there is provided a PUSCH transmission method according to overlapping with PUSCH/PUCCH transmission having a different priority index. In this case, in an embodiment of the disclosure, TBoMS repetitive transmission is described as continuous TBoMS PUSCH transmission regarding PUSCH transmittable resources with reference to the same number of PRBs and the same start symbol between TBoMS repetitive transmissions. However, this is merely an example, and various embodiments of the disclosure are not limited to the above-described embodiments, and TBoMS repetitive transmission may be configured based on a different number of PRBs, a different start symbol, a different symbol length between repetition transmissions. In addition, in an embodiment of the disclosure, a PUSCH transmission method has been described with reference to joint channel estimation of PUSCH repetitive transmission of the multi-PUSCH repetitive transmission type A, but this is merely an example, and various embodiments of the disclosure are not limited to the above-described embodiments, and joint channel estimation may be performed in continuous or discontinuous PUSCH transmission by which homeostasis of transmission power of the PUSCH and continuity of a phase are maintained, and various embodiments of the disclosure may be applied.

A PUSCH transmission method according to an embodiment of the disclosure provides a PUSCH transmission control method for a CI, a dynamic SFI, PUSCH/PUCCH overlapping having a different priority, and may enhance an uplink coverage through utilization of a flexible time domain resource. In explaining various embodiments of the disclosure, PUSCH transmission of TBoMS and joint channel estimation of PUSCH repetitive transmission have been described by way of an example, but this is merely an example, and various embodiments of the disclosure are not limited to the above-described embodiments, and various embodiments of the disclosure may be applied to transmission of PUSCH/PUCCH/PDSCH/PDCCH/physical side shared channel (PSSCH)/physical sidelink control channel (PSCCH) pre-defined/configured or configured through signaling between a base station and a terminal. In addition, according to various embodiments of the disclosure, a configuration method for TBoMS and joint channel estimation may be pre-defined/or configured or may be configured through signaling between a base station and a terminal. In this case, a certain value included in the configured information may be configured by one of a symbol/slot length, continuity of PUSCH transmission and an interval between PUSCH transmissions, the number of PUSCH transmissions, a transmission occasion, or a combination of these.

First Embodiment

The first embodiment of the disclosure provides a method for controlling a CI, a dynamic SFI, and PUSCH/PUCCH overlapping having a different priority when transmission (TBoMS) is performed with one TB being allocated to multiple slots. In various embodiments of the disclosure, the PUSCH will be mainly described, but this method may be applied to PDSCH/PSSCH transmission.

Method 1

In method 1, a PUSCH transmission method when a CI is configured in multi-slot PUSCH transmission configured with one TB (TBoMS), and a CI application method will be described.

Figure 10:
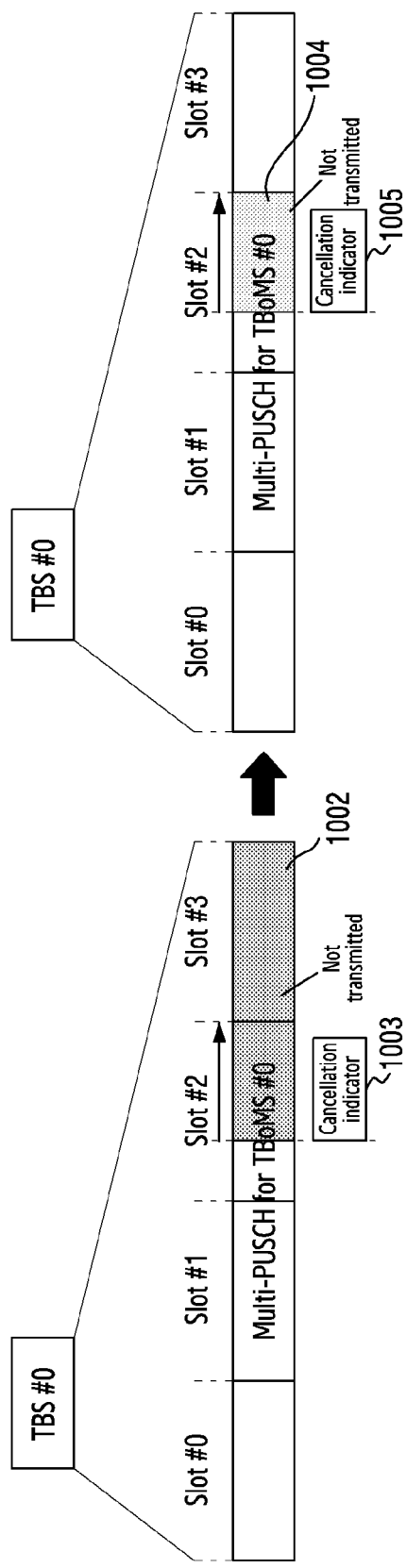
FIG. 10 is a view illustrating an example of an operation of a terminal which performs PUSCH transmission based on a CI configuration in multi-slot PUSCH transmission (TBoMS) configured with one TB in a wireless communication system according to an embodiment of the disclosure.
Figure 10:
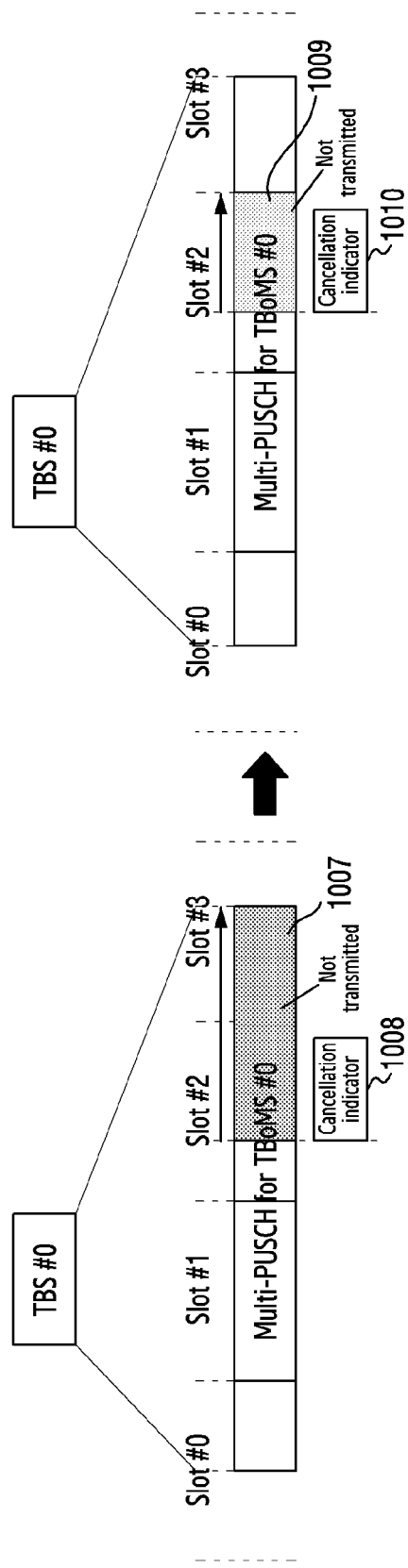

FIG. 10 illustrates an example of an operation of a terminal which performs PUSCH transmission based on a CI configuration in multi-slot PUSCH transmission (TBoMS) configured with one TB in a wireless communication system according to an embodiment of the disclosure.

Specifically, FIG. 10 illustrates an operation of a terminal which performs PUSCH transmission based on a CI configuration in multi-slot PUSCH transmission (TBoMS) configured with one TB in a 5G system.

Referring to FIG. 10, it illustrates a PUSCH transmission method according to a time domain resource allocation (TDRA) type of TBoMS when a terminal receives a configuration of a multi-slot PUSCH (TBoMS) configured with one TB from a base station through higher layer signaling or L1 signaling, and a CI is configured to overlap in slot #2.

The terminal may receive, from the base station, configuration information indicating that the number of slots (k) for transmitting multi-slot PUSCH (TBoMS) configured with one TB is 4, a start symbol S is 0, a symbol length L is 14 symbols, and a TDRA type is A, through higher layer signaling or L1 signaling 1001. In this case, TBoMS #0 configured with one TB over slots #0 to #3 may be transmitted based on the configured TBoMS information. Thereafter, when the terminal receives a configuration of a CI 1003 from the base station, and the configured CI overlaps in slot #2, symbols from an overlapping first symbol to a last symbol of TBoMS PUSCH transmission may not be transmitted 1002. In this case, since many symbols are not transmitted through the configured CI, decoding performance of TBoMS may be degraded. To solve this, when the terminal receives the configuration of the CI through higher layer signaling and L1 signaling, a range of a resource for applying the CI may be applied based on a boundary between overlapping slots, and the PUSCH may be transmitted. Referring to FIG. 10, when the terminal receives a configuration of TBoMS and a CI 1005 through higher layer signaling and L1 signaling, the terminal may cancel PUSCH transmission in slot #2 of TBoMS where the configured CI overlaps, with reference to a slot boundary 1004. Through the above-described method, more optimized PUSCH resources may be utilized, and through this, decoding performance may be enhanced and an uplink coverage may be enhanced.

The terminal may receive, from the base station, configuration information indicating that the number of slots (k) for transmitting multi-slot PUSCH (TBoMS) configured with one TB is 4, a start symbol S is 6, a symbol length L is 45 symbols, and a TDRA type is B, through higher layer signaling or L1 signaling 1006. In this case, TBoMS #0 configured with one TB over slots #0 to #3 may be transmitted based on the configured TBoMS information. Thereafter, when the terminal receives a configuration of a CI 1008 from the base station, and the configured CI overlaps in slot #2, symbols from an overlapping first symbol to a last symbol of TBoMS PUSCH transmission may not be transmitted 1007. In this case, since many symbols are not transmitted through the configured CI, decoding performance of TBoMS may be degraded. To solve this, when the terminal receives the configuration of the CI through higher layer signaling and L1 signaling, a range of a resource for applying the CI may be applied based on a boundary between overlapping slots, and the PUSCH may be transmitted. Referring to FIG. 10, when the terminal receives a configuration of TBoMS and a CI 1010 through higher layer signaling and L1 signaling, the terminal may cancel PUSCH transmission in slot #2 of TBoMS where the configured CI overlaps, with reference to a slot boundary 1009. Through the above-described method, more optimized PUSCH resources may be utilized, and through this, decoding performance may be enhanced and an uplink coverage may be enhanced. In explaining embodiments of the disclosure, a method of using a slot boundary to apply a CI to TBoMS has been described by way of an example, but this is merely an example and does not limit the scope of the disclosure. In the above-described method, a value serving as a reference may be configured by one of a slot boundary, a nominal repetition boundary, an actual repetition boundary, a transmission occasion boundary, a cancellation indication size, or a combination of these.

In addition, when the terminal receives a configuration of multi-slot PUSCH (TBoMS) configured with one TB from the base station through higher layer signaling or L1 signaling, the terminal may disregard a CI without applying even if the CI is received. In addition, considering a higher priority than the CI, the CI may not be applied. In this case, flexible scheduling based on the base station is impossible, but complexity of the terminal may be solved.

Method 2

In method 2, a PUSCH transmission method when a dynamic SFI is configured in multi-slot PUSCH transmission configured with one TB (TBoMS), and a dynamic SFI application method will be described.

Figure 11:
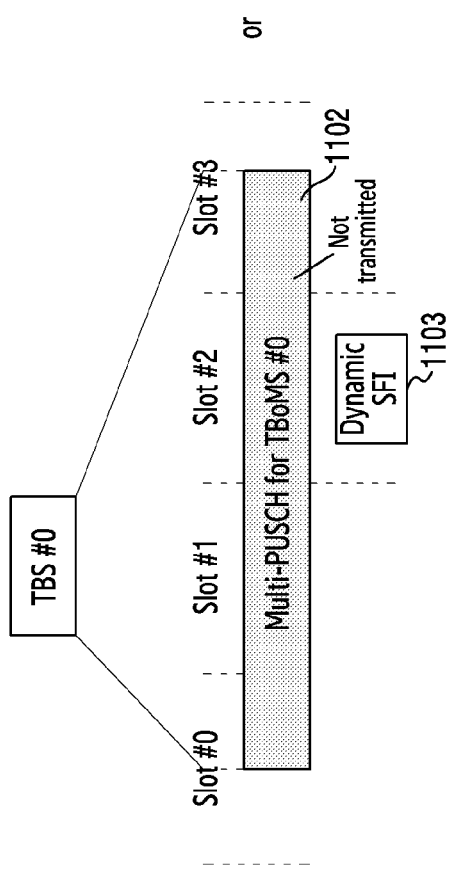
FIG. 11 is a view illustrating an example of an operation of a terminal which performs PUSCH transmission based on a CI configuration in multi-slot PUSCH transmission (TBoMS) configured with one TB in a wireless communication system according to an embodiment of the disclosure.
Figure 11:
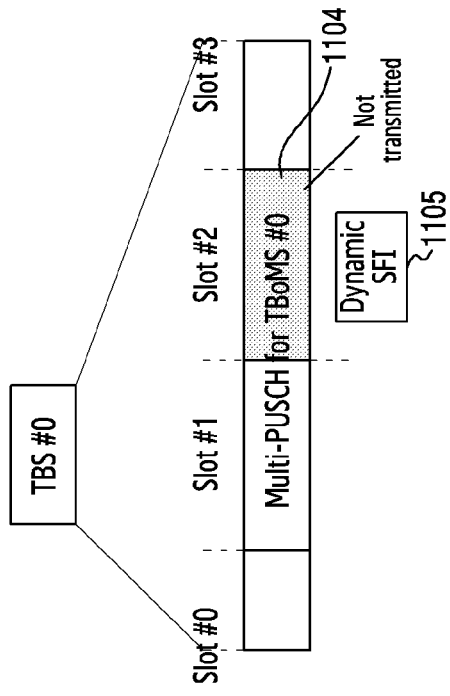

FIG. 11 illustrates an example of an operation of a terminal which performs PUSCH transmission based on a CI configuration in multi-slot PUSCH transmission (TBoMS) configured with one TB in a wireless communication system according to an embodiment of the disclosure.

Specifically, FIG. 11 is a view to explain an operation of a terminal which performs PUSCH transmission based on a CI configuration in multi-slot PUSCH transmission (TBoMS) configured with one TB in a 5G system.

Referring to FIG. 11, it illustrates a TBoMS PUSCH transmission method when a terminal receives a configuration of a multi-slot PUSCH (TBoMS) configured with one TB from a base station through higher layer signaling or L1 signaling, and a dynamic SFI configured through DCI format 2_0 overlaps in slot #2.

The terminal may receive, from the base station, configuration information indicating that the number of slots (k) for transmitting multi-slot PUSCH (TBoMS) configured with one TB is 4, a start symbol S is 6, a symbol length L is 45 symbols, and a TDRA type is B, through higher layer signaling or L1 signaling 1101. In this case, TBoMS PUSCH transmission may be performed with one TBS #0 over multi slots #0 to #3, based on the configured TBoMS information. In this case, when the terminal receives a dynamic FIC 1103 from the base station through DCI format 2_0, and the received dynamic SFI overlaps in slot #2 and a symbol of slot #2 is configured to a downlink, the entire TBoMS PUSCH transmission may be canceled 1102.

In addition, when the terminal receives, from the base station, configuration information indicating that the number of slots (k) for transmitting multi-slot PUSCH (TBoMS) configured with one TB is 4, a start symbol S is 6, a symbol length L is 45 symbols, a TDRA type is B, through higher layer signaling or L1 signaling, TBoMS PUSCH transmission may be performed with one TBS #0 over multiple slots #0 to #3, based on the information of the configured TBoMS. In this case, when the terminal receives a dynamic SFI 1105 from the base station through DCI format 2_0, and the received dynamic SFI overlaps in slot #2 and a symbol of slot #2 is configured to a downlink, the terminal may not transmit only slot #2 which is a part of TBoMS based on a slot boundary 1104, and may perform TBoMS PUSCH transmission through uplink resources of the other slots #0, #1, #3. In explaining embodiments of the disclosure, the method of using a slot boundary in order to apply a dynamic SFI to TBoMS through DCI format 2_0 has been described by way of an example, but this is merely an example and do not limit the scope of the disclosure. A value serving as a reference in the above-described method may be configured by one of a slot boundary, a nominal repetition boundary, an actual repetition boundary, a transmission occasion boundary, a dynamic SFI symbol size, or a combination of these. In addition, in explaining embodiments of the disclosure, the dynamic SFI may be configured over multiple slots and PUSCH transmission through the DCI format 2_0.

When TBoMS is configured through higher layer signaling and L1 signaling in an additional method, the terminal may not apply the dynamic SFI which is configured through DCI format 2_0 and may disregard the dynamic SFI. In this case, TBoMS may be supported while solving complexity of the terminal.

Method 3

In method 3, when multi-slot PUSCH transmission (TBoMS) configured with one TB is configured, a method for configuring a priority of PUSCH transmission and a PUSCH transmission method according to the priority will be described.

A terminal may receive, from a base station, configuration information of multi-slot PUSCH (TBoMS) transmission configured with one TB, through higher layer signaling or L1 signaling. In this case, the base station may configure a priority of TBoMS to a high priority (=1) for the terminal. In this case, when there is overlapping with PUSCH/PUCCH transmission having a low priority, the PUSCH/PUCCH having the low priority may not be transmitted. Through the above-described method, reliability of TBoMS PUSCH transmission may be guaranteed and an operation may be performed without adding an additional terminal function, so that complexity of the terminal may be solved.

Based on the methods (methods 1 to 3) of the above-described embodiments, when multi-slot PUSCH (TBoMS) transmission configured with one TB is configured through higher layer signaling and L1 signaling, and a CI, a dynamic SFI are configured, the terminal may cancel only time resources of a part of TBoMS, and may transmit. In addition, resources that are not transmitted through the above-described methods may be postponed according to a configuration mode (for example, a count-based PUSCH configuration) through higher layer signaling and L1 signaling, and may be transmitted again. Through the above-described methods of the disclosure, CI, dynamic SFI, PUSCH/PUCCH overlapping methods for TBoMS PUSCH transmission may be suggested to enhance an uplink coverage, and through this, an energy gain may be obtained through an optimized resource configuration and a coverage of an uplink may be enhanced.

Second Embodiment

The second embodiment of the disclosure provides a method for controlling a CI, a dynamic SFI, and PUSCH/PUCCH overlapping a different priority when joint channel estimation is performed with respect to multi-PUSCH. In the disclosure, the PUSCH will be mainly described, but these methods may be applied to transmission of a PUCCH/PDCCH/PDSCH/PSSCH/PSCCH.

Method 1

In method 1, a PUSCH transmission method when a CI is configured in multiple PUSCHs in which joint channel estimation is performed, and a CI application method will be described.

Figure 12:
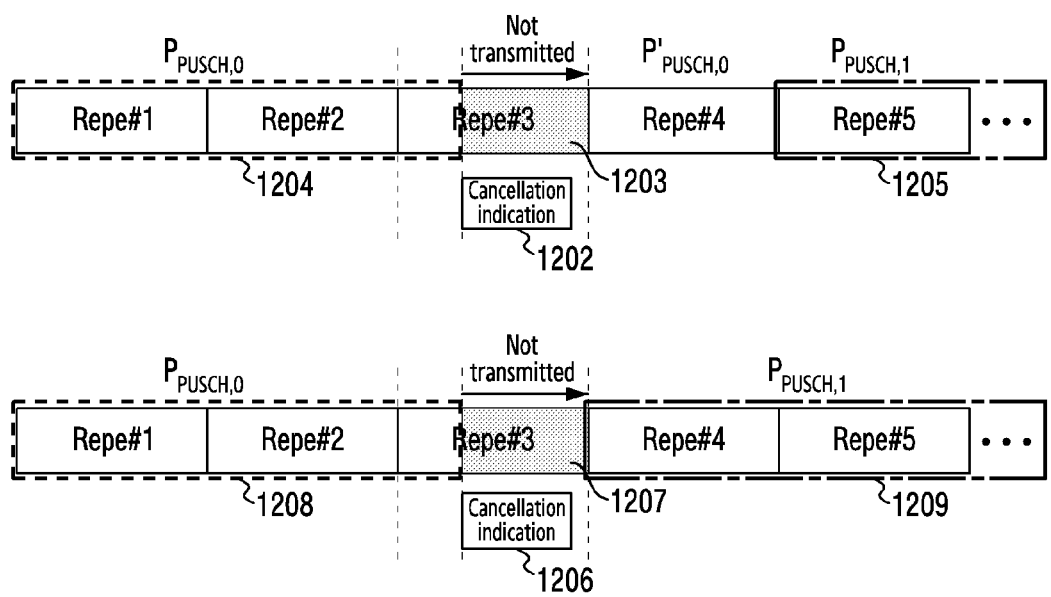
FIG. 12 is a view illustrating an example of an operation of a terminal which performs PUSCH transmission based on a CI configuration in multiple PUSCHs in which joint channel estimation is performed in a wireless communication system according to an embodiment of the disclosure.

FIG. 12 illustrates an example of an operation of a terminal which performs PUSCH transmission, based on a CI configured in multiple PUSCHs in which joint channel estimation is performed, in a wireless communication system according to an embodiment of the disclosure.

Specifically, FIG. 12 illustrates an operation of a terminal which performs PUSCH transmission based on a CI configuration in multiple PUSCHs in which joint channel estimation is performed in a 5G system.

Referring to FIG. 12, the terminal receives a configuration of PUSCH repetitive transmission through higher layer signaling or L1 signaling, and may receive a configuration indicating that a bundle size is 4 slots as a configuration value for performing joint channel estimation 1201. In this case, joint channel estimation may be performed in Repe #1 to #4 based on the bundle size configured in the configured PUSCH repetitive transmission, and power homeostasis and phase continuity of PUSCH repetitive transmission Repe #1 to #4 may be maintained to perform joint channel estimation. In this case, when a CI 1202 is configured through higher layer signaling and L1 signaling, transmission of all symbols of Repe #3 from a first symbol of the CI in Repe #3 where the configured CI overlaps may be canceled 1203. In this case, due to PUSCH repetitive transmission which is canceled by the configured CI, continuity of a phase in Repe #1 to #2, a part of Repe #3, and Repe #4 is not maintained. Accordingly, $P_{PUSCH,0}$ and $P'_{PUSCH,0}$ having different phases may be applied with reference to the point of the canceled PUSCH transmission, respectively, based on the same transmit power configuration. Channel estimation of PUSCH repetitive transmission may include joint channel estimation 1204 in Repe #1 to #2, a part of Repe #3, single channel estimation in Repe #4, and joint channel estimation 1205 on a bundle size basis after Repe #5. In the above-described configuration, a part of Repe #3 may not be used for joint channel estimation and PUSCH transmission according to a configuration and a condition in resource transmission. A configuration of transmit power of the configured Repe #4 may be updated according to a configuration and a condition (for example, a minimum processing time for applying a configuration).

According to the above-described method, the terminal may receive a configuration of PUSCH repetitive transmission from the base station through higher layer signaling or L1 signaling, and may receive a configuration indicating that a bundle size is 4 slots as a configuration value for performing joint channel estimation 1201. In this case, joint channel estimation may be performed in Repe #1 to #4 based on the bundle size configured in the configured PUSCH repetitive transmission, and power homeostasis and phase continuity of PUSCH repetitive transmission Repe #1 to #4 1208 may be maintained to perform joint channel estimation. In this case, when a CI 1206 is configured through higher layer signaling and L1 signaling, transmission of all symbols in Repe #3 from a first symbol of the CI in Repe #3 where the configured CI overlaps may be canceled 1207. In this case, due to the PUSCH repetitive transmission canceled by the configured CI, phase continuity in Repe #1 to #2, a part of Repe #3, and Repe #4 may not be maintained. In this case, joint channel estimation may be performed in Repe #4 from the point of canceled PUSCH transmission of Repe #3, and the PUSCH may be transmitted with the same transmit power from Repe #4 based on the bundle size. Accordingly, transmit power may be configured to $P_{PUSCH,0}$ and $P_{PUSCH,1}$ with reference to the point of Repe #3. Thereafter, channel estimation of PUSCH repetition transmission may include joint channel estimation 1209 in Repe #1 to #2, a part of Repe #3, and joint channel estimation 1209 on a bundle size basis after Repe #4. In the above-described configuration, a part of Repe #3 may not be used for joint channel estimation and PUSCH transmission according to a configuration and a condition in resource transmission.

Finally, when the terminal receives a configuration of joint channel estimation through higher layer signaling and L1 signaling, the terminal may perform joint channel estimation with respect to multi-PUSCH transmission by a method of disregarding a CI. In this case, an operation may be performed without implementing an additional function of the terminal, so that complexity of the terminal may be solved.

Through the above-described method of the disclosure, a control method for multi-PUSCH transmission in which joint channel estimation is performed according to a CI may be defined, and an uplink coverage may be enhanced through optimized joint channel estimation. In explaining embodiments of the disclosure, a method for applying a CI to the multi-PUSCH repetitive transmission type A in which joint channel estimation is performed has been described by way of an example, but this is merely an example and does not limit the scope of the disclosure, and as a value serving as a reference in the above-described method, the PUSCH repetitive transmission type B in which joint channel estimation is performed, joint channel estimation in PUSCH repetitive transmission configured with other TBs, joint channel estimation in TBoMS may be applied.

Method 2

In method 2, a PUSCH transmission method when a dynamic SFI is configured in multiple PUSCHs in which joint channel estimation is performed, and a dynamic SFI application method will be described.

Figure 13:
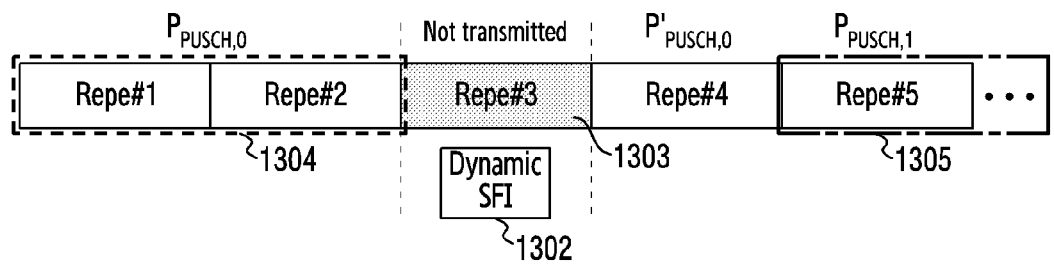
FIG. 13 is a view illustrating an example of an operation of a terminal which performs PUSCH transmission based on an SFI configuration in multiple PUSCHs in which joint channel estimation is performed in a wireless communication system according to an embodiment of the disclosure.
Figure 13:
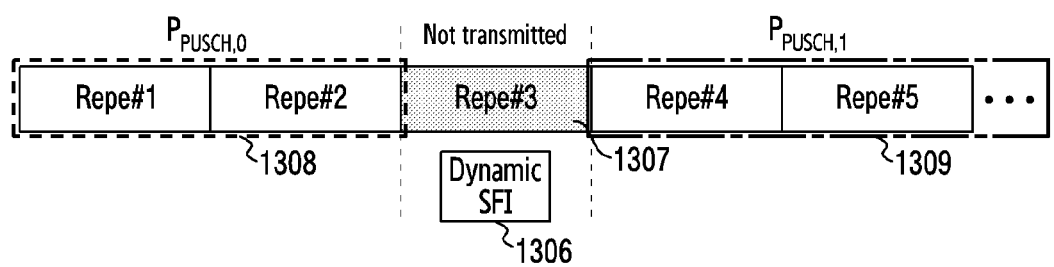

FIG. 13 illustrates an example of an operation of a terminal which performs PUSCH transmission, based on a dynamic SFI configured in multiple PUSCHs in which joint channel estimation is performed, in a wireless communication system according to an embodiment of the disclosure.

Specifically, FIG. 13 is a view to explain an operation of a terminal which performs PUSCH transmission based on a dynamic SFI configuration in multiple PUSCHs in which joint channel estimation is performed in a 5G system.

Referring to FIG. 13, the terminal receives a configuration of PUSCH repetitive transmission through higher layer signaling or L1 signaling, and may receive a configuration indicating that a bundle size is 4 slots as a configuration value for performing joint channel estimation 1301. In this case, joint channel estimation may be performed in Repe #1 to #4 based on the bundle size configured in the configured PUSCH repetitive transmission, and power homeostasis and phase continuity of PUSCH repetitive transmission Repe #1 to #4 may be maintained to perform joint channel estimation. In this case, when a dynamic SFI 1302 is configured through DCI format 2_0, transmission in Repe #3 where the configured dynamic SFI overlaps may be canceled 1303. In this case, due to PUSCH repetitive transmission which is canceled by the configured dynamic SFI, continuity of a phase in Repe #1 to #2 and Repe #4 is not maintained. Accordingly, $P_{PUSCH,0}$ and $P'_{PUSCH,0}$ having different phases may be applied with reference to the point of the canceled PUSCH transmission, respectively, based on the same transmit power configuration. Channel estimation of PUSCH repetitive transmission may include joint channel estimation 1304 in Repe #1 to #2, single channel estimation in Repe #4, and joint channel estimation 1305 on a bundle size basis after Repe #5. A configuration of transmit power of the configured Repe #4 may be updated according to a configuration and a condition (for example, a minimum processing time for applying a configuration).

According to the above-described method, the terminal may receive a configuration of PUSCH repetitive transmission from the base station through higher layer signaling or L1 signaling, and may receive a configuration indicating that a bundle size is 4 slots as a configuration value for performing joint channel estimation 1301. In this case, joint channel estimation may be performed in Repe #1 to #4 1308 based on the bundle size configured in the configured PUSCH repetitive transmission, and power homeostasis and phase continuity of PUSCH repetitive transmission Repe #1 to #4 may be maintained to perform joint channel estimation. In this case, when a dynamic SFI 1306 is configured through DCI format 2_0, transmission in Repe #3 where the configured dynamic SFI overlaps may be canceled 1307. In this case, due to the PUSCH repetitive transmission canceled by the configured dynamic SFI, phase continuity in Repe #1 to #2 and Repe #4 may not be maintained. In this case, joint channel estimation may be performed in Repe #4 from the point of canceled PUSCH transmission of Repe #3, and the PUSCH may be transmitted with the same transmit power from Repe #4 based on the bundle size. Accordingly, transmit power of Repe #1 to #2 and Repe #4 to #5 may be configured to $P_{PUSCH,0}$ and $P_{PUSCH,1}$ with reference to the point of Repe #3. Thereafter, channel estimation of PUSCH repetitive transmission may include joint channel estimation 1309 in Repe #1 to #2 and joint channel estimation 1309 on a bundle size basis after Repe #4. In the above-described configuration, a part of Repe #3 may not be used for joint channel estimation and PUSCH transmission according to a configuration and a condition in resource transmission.

Finally, when the terminal receives a configuration of joint channel estimation through higher layer signaling and L1 signaling, the terminal may perform joint channel estimation with respect to multi-PUSCH transmission by a method of disregarding a dynamic SFI. In this case, an operation may be performed without implementing an additional function of the terminal, so that complexity of the terminal may be solved.

Through the above-described method of the disclosure, a control method for multi-PUSCH transmission in which joint channel estimation is performed according to a dynamic SFI may be defined, and an uplink coverage may be enhanced through optimized joint channel estimation. In explaining embodiments of the disclosure, a method for applying a dynamic SFI to the multi-PUSCH repetitive transmission type A in which joint channel estimation is performed has been described by way of an example, but this is merely an example and does not limit the scope of the disclosure, and as a value serving as a reference in the above-described method, the PUSCH repetitive transmission type B in which joint channel estimation is performed, joint channel estimation in PUSCH repetitive transmission configured with other TBs, joint channel estimation in TBoMS may be applied. In addition, in explaining embodiments of the disclosure, the dynamic SFI may be configured over various slots and PUSCH transmissions through DCI format 2_0.

Method 3

In method 3, when multi-PUSCH transmission in which joint channel estimation is performed is configured, a method for configuring a priority of PUSCH transmission and a PUSCH transmission method according to the priority will be described.

A terminal may receive, from a base station, configuration information of multi-PUSCH transmission in which joint channel estimation is performed, through higher layer signaling or L1 signaling. In this case, the base station may configure a priority of multi-PUSCH transmission in which joint channel estimation is performed to a high priority (=1) for the terminal. In this case, when there is overlapping with PUSCH/PUCCH transmission having a low priority, the PUSCH/PUCCH having the low priority may not be transmitted. Through the above-described method, reliability of multi-PUSCH transmission in which joint channel estimation is performed may be guaranteed, and an operation may be performed without adding an additional terminal function, so that complexity of the terminal may be solved.

Based on the methods (methods 1 to 3) of the above-described embodiments, when multi-PUSCH transmission in which joint channel estimation is performed is configured through higher layer signaling and L1 signaling, and a CI, a dynamic SFI are configured, the terminal may cancel a part of multi-PUSCH transmission in which joint channel estimation is performed, and may transmit. In addition, resources that are not transmitted through the above-described methods may be postponed according to a configuration mode (for example, a count-based PUSCH configuration) through higher layer signaling and L1 signaling, and may be transmitted again. Through the above-described methods of the disclosure, CI, dynamic SFI, PUSCH/PUCCH overlapping methods for multi-PUSCH transmission in which joint channel estimation is performed may be suggested to enhance an uplink coverage, and through this, accuracy of channel estimation may be enhanced by an optimized resource configuration for joint channel estimation, and a coverage of an uplink may be enhanced.

Third Embodiment

The third embodiments of the disclosure may provide a method of controlling configurations of a CI and a dynamic SFI in multi-slot PUSCH transmission configured with one TB (TBoMS) and PUSCH transmission in which joint channel estimation is performed.

Figure 14:
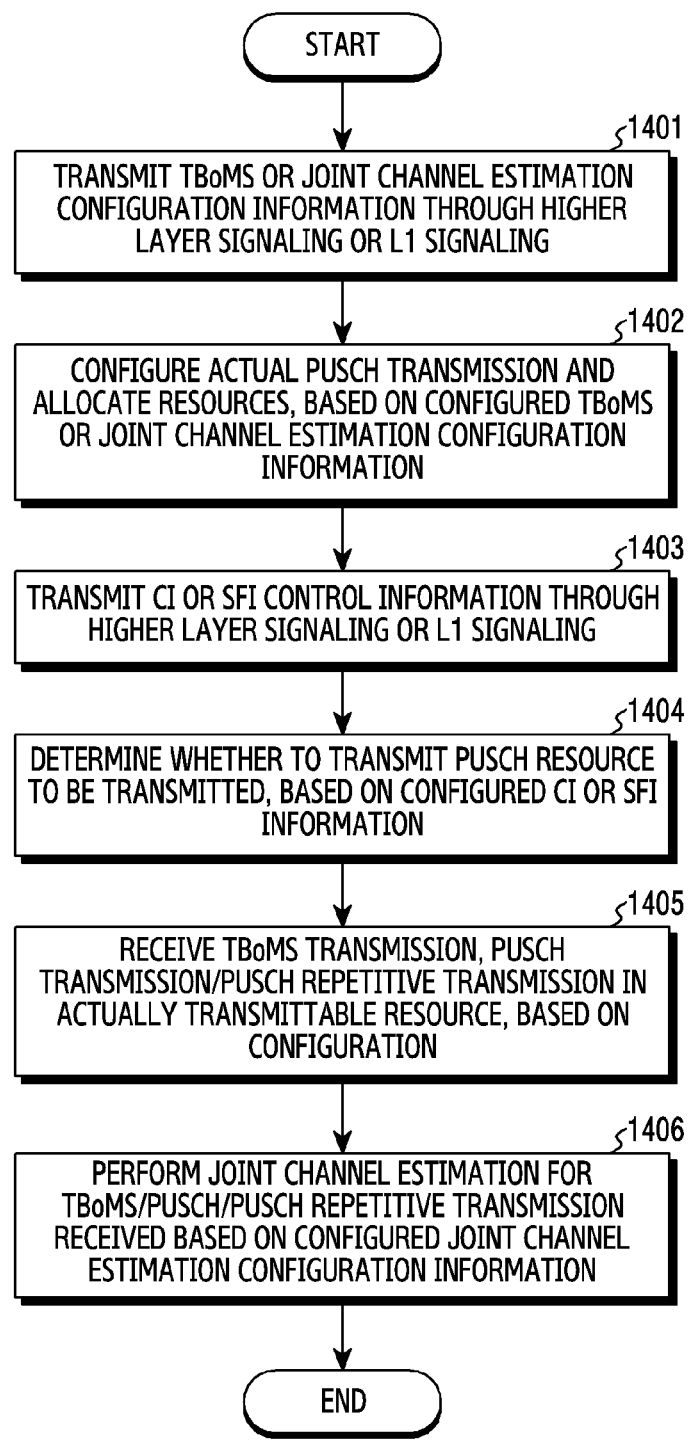
FIG. 14 is a flowchart illustrating an operation of a base station which controls a CI and a dynamic SFI for multi-slot PUSCH transmission configured with one TB (TBoMS) and PUSCH transmission in which joint channel estimation is performed in a wireless communication system according to an embodiment of the disclosure.

FIG. 14 is a flowchart illustrating an operation of a base station which controls a CI and a dynamic SFI for multi-slot PUSCH transmission configured with one TB (TBoMS) and PUSCH transmission in which joint channel estimation is performed in a wireless communication system according to an embodiment of the disclosure.

Referring to FIG. 14, it is a flowchart to explain an operation of a base station which controls a CI and a dynamic SFI in multi-slot PUSCH transmission configured with one TB (TBoMS) and PUSCH transmission in which joint channel estimation is performed according to various embodiments of the disclosure.

The base station may transmit first configuration information regarding TBoMS or joint channel estimation, through higher layer signaling or L1 signaling at operation 1401. The first configuration information may include at least one of a position of a start symbol, a length of a symbol, the number of multiple slots, information regarding a time domain resource allocation type, and a bundling size for joint channel estimation. Thereafter, the base station may allocate actually transmittable resources for PUSCH transmission, based on the first configuration information regarding TBoMS or joint channel estimation at operation 1402. Thereafter, the base station may flexibly configure resources by transmitting second configuration information regarding a CI or a dynamic SFI to a terminal through higher layer signaling or L1 signaling at operation 1403. The base station may determine whether to transmit a PUSCH resource to be transmitted, based on the second configuration information at operation 1404. The second configuration information may be information regarding a priority of the PUSCH transmission resource, and it may be determined whether to transmit the PUSCH transmission resource according to whether the PUSCH transmission resource overlaps a PUSCH transmission resource having a different priority or a physical uplink shared control channel (PUSCCH) transmission resource having a different priority. Thereafter, based on the second configuration information, the base station may receive at least one of TBoMS PUSCH transmission, PUSCH transmission, or PUSCH repetitive transmission in the actually transmittable resource at operation 1405. Thereafter, the base station may perform joint channel estimation with respect to at least one of the TBoMS PUSCH transmission, the PUSCH transmission, or the PUSCH repetitive transmission received, based on the joint channel estimation configuration information, and may perform decoding at operation 1406.

Figure 15:
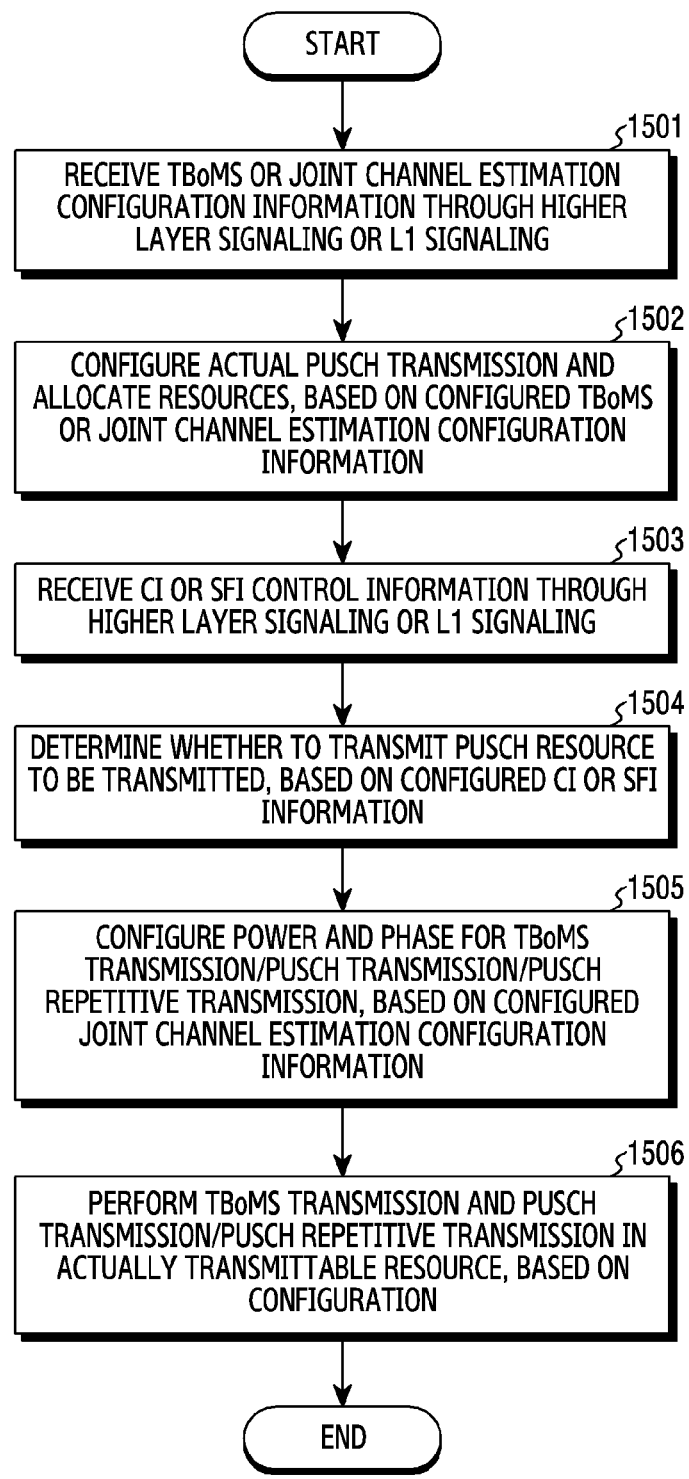
FIG. 15 is a flowchart illustrating an operation of a terminal which controls a CI and a dynamic SFI for multi-slot PUSCH transmission configured with one TB (TBoMS) and PUSCH transmission in which joint channel estimation is performed in a wireless communication system according to an embodiment of the disclosure.

FIG. 15 is a flowchart illustrating an operation of a terminal which controls a CI and a dynamic SFI for multi-slot PUSCH transmission configured with one TB (TBoMS) and PUSCH transmission in which joint channel estimation is performed in a wireless communication system according to an embodiment of the disclosure.

Referring to FIG. 15, it is a flowchart to explain an operation of a terminal which controls a CI and a dynamic SFI in multi-slot PUSCH transmission configured with one TB (TBoMS) and PUSCH transmission in which joint channel estimation is performed according to various embodiments of the disclosure.

The terminal may receive, from a base station, first configuration information regarding TBoMS or joint channel estimation, through higher layer signaling or L1 signaling at operation 1501. The first configuration information may include at least one of a position of a start symbol, a length of a symbol, the number of multiple slots, information regarding a time domain resource allocation type, and a bundling size for joint channel estimation. Thereafter, the terminal may allocate actually transmittable resources for PUSCH transmission, based on the first configuration information regarding TBoMS or joint channel estimation at operation 1502. Thereafter, the terminal may receive second configuration information regarding a CI or a dynamic SFI from the base station through higher layer signaling or L1 signaling, and may allocate resources at operation 1503. The second configuration information may be information regarding a priority of the PUSCH transmission resource, and it may be determined whether to transmit the PUSCH transmission resource according to whether the PUSCH transmission resource overlaps a PUSCH transmission resource having a different priority or a PUSCCH transmission resource having a different priority. The terminal may determine whether to transmit a PUSCH resource to be transmitted, based on the second configuration information at operation 1504. Thereafter, based on the first configuration information, the terminal may configure to maintain homeostasis of PUSCH transmit power and continuity of a phase regarding at least one of TBoMS PUSCH transmission, PUSCH transmission, or PUSCH repetitive transmission at operation 1505. Thereafter, the terminal may perform at least one of the TBoMS transmission, the PUSCH transmission, or the PUSCH repetitive transmission in an actually transmittable resource, based on the first configuration information at operation 1506.

Figure 16:
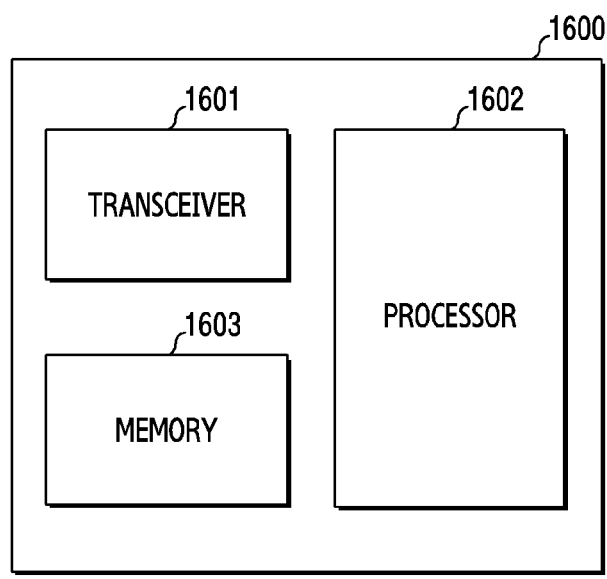
FIG. 16 is a block diagram of a terminal according to an embodiment of the disclosure.

FIG. 16 is a block diagram of a terminal according to an embodiment of the disclosure.

Referring to FIG. 16, a terminal 1600 may include a transceiver 1601, a controller (processor) 1602, and a storage (memory) 1603. According to an efficient channel and signal transceiving method in a 5G communication system corresponding to the above-described embodiment, the transceiver 1601, the controller 1602, and the storage 1603 of the terminal 1600 may operate. However, components of the terminal 1600 according to an embodiment are not limited to the above-described example. According to another embodiment, the terminal 1600 may include more components than the above-described components or may include fewer components. In addition, in a specific case, the transceiver 1601, the controller 1602, and the storage 1603 may be implemented in the form of a single chip.

The transceiver 1601 may include a transmitter and a receiver according to another embodiment. The transceiver 1601 may exchange signals with a base station. The signals may include control information and data. To achieve this, the transceiver 1601 may include a radio frequency (RF) transmitter to up-convert and amplify a frequency of a transmitted signal, and an RF receiver to low-noise amplify a received signal and to down-convert a frequency. In addition, the transceiver 1601 may receive a signal through a wireless channel and may output the signal to the controller 1602, and may transmit a signal outputted from the controller 1602 through the wireless channel.

The controller 1602 may control a series of processes for operating the terminal 1600 according to the above-described embodiment of the disclosure. For example, the controller 1602 may perform a method of changing an OFDM symbol position of a DRAB by considering a method of estimating a channel by using DRMSs transmitted through a plurality of PUSCHs simultaneously. To achieve this, the controller 1602 may include at least one processor. For example, the controller 1602 may include a communication processor (CP) to perform control for communication, and an application processor (AP) to control a higher layer such as an application program.

The storage 1603 may store control information or data such as information related to channel estimation which uses DMRSs transmitted through a PUSCH included in a signal obtained by the terminal 1600, and may have an area for storing data necessary for control of the controller 1602 and data generated when the controller 1602 controls. The storage 1603 may be configured with a volatile memory, a nonvolatile memory, or a combination of a volatile memory and a nonvolatile memory.

Figure 17:
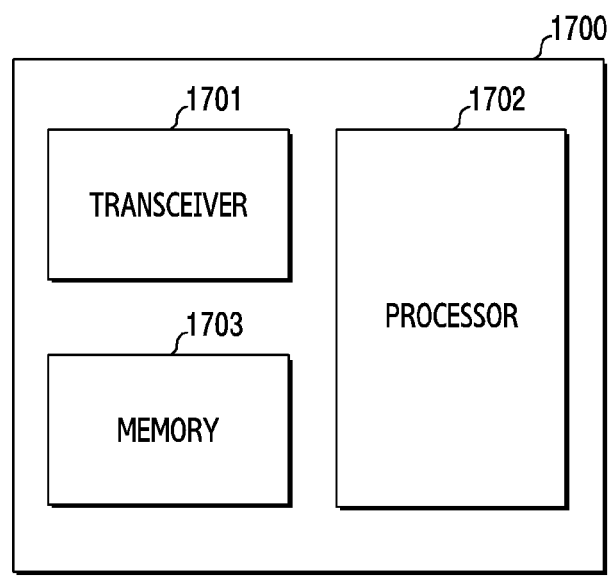
FIG. 17 is a block diagram of a base station according to an embodiment of the disclosure.

FIG. 17 is a block diagram of a base station according to an embodiment of the disclosure.

Referring to FIG. 17, a base station 1700 may include a transceiver 1701, a controller (processor) 1702, and a storage (memory) 1703. According to an efficient channel and signal transceiving method in a 5G communication system corresponding to the above-described embodiment, the transceiver 1701, the controller 1702, and the storage 1703 of the base station 1700 may operate. However, components of the base station 1700 according to an embodiment are not limited to the above-described example. According to another embodiment, the base station 1700 may include more components than the above-described components or may include fewer components. In addition, in a specific case, the transceiver 1701, the controller 1702, and the storage 1703 may be implemented in the form of a single chip.

The transceiver 1701 may include a transmitter and a receiver according to another embodiment. The transceiver 1701 may exchange signals with a terminal. The signals may include control information and data. To achieve this, the transceiver 1701 may include an RF transmitter to up-convert and amplify a frequency of a transmitted signal, and an RF receiver to low-noise amplify a received signal and to down-convert a frequency. In addition, the transceiver 1701 may receive a signal through a wireless channel and may output the signal to the controller 1702, and may transmit a signal outputted from the controller 1702 through the wireless channel.

The controller 1702 may control a series of processes for operating the base station 1700 according to the above-described embodiment of the disclosure. For example, the controller 1702 may perform a method of changing an OFDM symbol position of a DRMS by considering a method of estimating a channel by using DRMSs transmitted through a PUSCH. To achieve this, the controller 1702 may include at least one processor. For example, the controller 1702 may include a communication processor (CP) to perform control for communication, and an application processor (AP) to control a higher layer such as an application program.

The storage 1703 may store control information, data of information related to channel estimation or control information, data received from the terminal, by using DMRSs transmitted through the PUSCH determined by the base station 1700, and may have an area for storing data necessary for control of the controller 1702 and data generated when the controller 1702 controls. The storage 1703 may be configured with a volatile memory, a nonvolatile memory, or a combination of a volatile memory and a nonvolatile memory.

Various embodiments of the disclosure provide an apparatus and a method for transmitting an uplink channel in a wireless communication system.

The effect achieved by the disclosure is not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    receiving, from a base station, configuration information associated with a physical uplink shared channel (PUSCH) repetition;
    transmitting, to the base station, a first PUSCH for the PUSCH repetition based on the configuration information associated with the PUSCH repetition;
    identifying that an event occurs which causes a phase continuity for the PUSCH repetition not to be maintained, wherein the event is associated with a reception of downlink control information (DCI) including a cancellation indication (CI) or a dynamic slot-format indication (SFI);
    identifying whether to restart a bundling associated with the PUSCH repetition; and
    transmitting, to the base station, a second PUSCH for the PUSCH repetition after the event, based on the identification whether to restart the bundling associated with the PUSCH repetition.

2. The method of claim 1,
    wherein the PUSCH repetition is stopped based on the event,
    wherein the event is associated with an overlap with a higher priority PUSCH transmission,
    wherein the bundling associated with the PUSCH repetition is restarted from a first symbol after the event, and
    wherein whether to restart the bundling associated with the PUSCH repetition is identified based on a capability of the UE.

3. The method of claim 1, wherein the configuration information is for a transport block (TB) processing over multi-slot (TBoMS), and the configuration information is received through a higher layer signaling.

4. The method of claim 1, wherein the configuration information comprises at least one of a position of a start symbol, a length of a symbol, a number of multiple slots, a time domain resource allocation type, or a bundling size for joint channel estimation.

5. A method performed by a base station in a wireless communication system, the method comprising:
    transmitting, to a user equipment (UE), configuration information associated with a physical uplink shared channel (PUSCH) repetition;
    receiving, from the UE, a first PUSCH for the PUSCH repetition based on the configuration information associated with the PUSCH repetition;
    identifying that an event occurs which causes a phase continuity for the PUSCH repetition not to be maintained, wherein the event is associated with a transmission of downlink control information (DCI) including a cancellation indication (CI) or a dynamic slot-format indication (SFI); and
    receiving, from the UE, a second PUSCH for the PUSCH repetition after the event, wherein a bundling associated with the PUSCH repetition is restarted after the event.

6. The method of claim 5,
wherein the PUSCH repetition is stopped based on the event,
wherein the event is associated with an overlap with a higher priority PUSCH transmission,
wherein the bundling associated with the PUSCH repetition is restarted from a first symbol after the event, and
wherein the bundling associated with the PUSCH repetition is restarted based on a capability of the UE.

7. The method of claim 5,
wherein the configuration information is for a transport block (TB) processing over multi-slot (TBoMS) and the configuration information is transmitted through a higher layer signaling, and
wherein the configuration information comprises at least one of a position of a start symbol, a length of a symbol, a number of multiple slots, a time domain resource allocation type, or a bundling size for joint channel estimation.

8. A user equipment (UE) in a wireless communication system, the UE comprising:
a transceiver; and
a controller coupled with the transceiver and configured to:
receive, from a base station, configuration information associated with a physical uplink shared channel (PUSCH) repetition,
transmit, to the base station, a first PUSCH for the PUSCH repetition based on the configuration information associated with the PUSCH repetition,
identify that an event occurs which causes a phase continuity for the PUSCH repetition not to be maintained, wherein the event is associated with a reception of downlink control information, DCI, including a cancellation indication (CI) or a dynamic slot-format indication (SFI),
identify whether to restart a bundling associated with the PUSCH repetition, and
transmit, to the base station, a second PUSCH for the PUSCH repetition after the event, based on the identification whether to restart the bundling associated with the PUSCH repetition.

9. The UE of claim 8,
wherein the PUSCH repetition is stopped based on the event,
wherein the event is associated with an overlap with a higher priority PUSCH transmission,
wherein the bundling associated with the PUSCH repetition is restarted from a first symbol after the event, and
wherein whether to restart the bundling associated with the PUSCH repetition is identified based on a capability of the UE.

10. The UE of claim 8, wherein the configuration information is for a transport block (TB) processing over multi-slot (TBoMS), and the configuration information is received through a higher layer signaling.

11. The UE of claim 8, wherein the configuration information comprises at least one of a position of a start symbol, a length of a symbol, a number of multiple slots, a time domain resource allocation type, or a bundling size for joint channel estimation.

12. A base station in a wireless communication system, the base station comprising:
a transceiver; and
a controller coupled with the transceiver and configured to:
transmit, to a user equipment (UE), configuration information associated with a physical uplink shared channel (PUSCH) repetition,
receive, from the UE, a first PUSCH for the PUSCH repetition based on the configuration information associated with the PUSCH repetition,
identify that an event occurs which causes a phase continuity for the PUSCH repetition not to be maintained, wherein the event is associated with a transmission of downlink control information (DCI) including a cancellation indication (CI) or a dynamic slot-format indication (SFI), and
receive, from the UE, a second PUSCH for the PUSCH repetition after the event, wherein a bundling associated with the PUSCH repetition is restarted after the event.

13. The base station of claim 12,
wherein the PUSCH repetition is stopped based on the event,
wherein the event is associated with an overlap with a higher priority PUSCH transmission,
wherein the bundling associated with the PUSCH repetition is restarted from a first symbol after the event, and
wherein the bundling associated with the PUSCH repetition is restarted based on a capability of the UE.

14. The base station of claim 12, wherein the configuration information is for a transport block (TB) processing over multi-slot (TBoMS) and the configuration information is transmitted through a higher layer signaling.

15. The base station of claim 12, wherein the configuration information comprises at least one of a position of a start symbol, a length of a symbol, a number of multiple slots, a time domain resource allocation type, or a bundling size for joint channel estimation.

* * * * *